United States Patent
Yotsugi et al.

(10) Patent No.: US 7,711,833 B2
(45) Date of Patent: May 4, 2010

(54) NETWORK SYSTEM, NETWORK CONTROL METHOD, AND PROGRAM

(75) Inventors: Hirotomo Yotsugi, Tokyo (JP);
Kazuhiro Namba, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 58 days.

(21) Appl. No.: 10/557,256

(22) PCT Filed: May 14, 2004

(86) PCT No.: PCT/JP2004/006541
§ 371 (c)(1),
(2), (4) Date: Nov. 1, 2006

(87) PCT Pub. No.: WO2004/102409
PCT Pub. Date: Nov. 25, 2004

(65) Prior Publication Data
US 2007/0083654 A1    Apr. 12, 2007

(51) Int. Cl.
*G06F 15/16* (2006.01)
(52) U.S. Cl. .................. 709/229; 709/203; 709/227
(58) Field of Classification Search ............... None
See application file for complete search history.

(56) References Cited
U.S. PATENT DOCUMENTS

| | | | | |
|---|---|---|---|---|
| 6,134,584 A | * | 10/2000 | Chang et al. | 709/219 |
| 6,832,239 B1 | * | 12/2004 | Kraft et al. | 709/203 |
| 7,069,297 B2 | * | 6/2006 | Kimura et al. | 709/203 |
| 2002/0099831 A1 | * | 7/2002 | Tsunogai | 709/227 |
| 2002/0161913 A1 | * | 10/2002 | Gonzalez et al. | 709/233 |
| 2003/0033359 A1 | | 2/2003 | Asoh | |
| 2003/0093520 A1 | * | 5/2003 | Beesley | 709/224 |
| 2003/0220983 A1 | * | 11/2003 | Hui | 709/219 |

FOREIGN PATENT DOCUMENTS

| | | |
|---|---|---|
| JP | 2002/99831 A | 4/2002 |
| JP | 2002/143566 A | 5/2002 |
| JP | 2002/149534 A | 5/2002 |
| JP | 2003/58499 A | 2/2003 |

* cited by examiner

*Primary Examiner*—Moustafa M Meky
*Assistant Examiner*—Ho Shiu
(74) *Attorney, Agent, or Firm*—Global IP Counselors, LLP

(57) ABSTRACT

A network system connected with a plurality of clients over a network, and having process executing means for executing processing requested from each client, comprises process request controlling means, and load distributing means for selectively connecting a client that requested processing with process executing means or process request controlling means, based on the processing situation in the process executing means or the usage situation of the network circuits connected with the process executing means. The process request controlling means indicate to the client re-request timing for the client to make the request again based on predetermined conditions, while rejecting requests for processing from the client.

9 Claims, 12 Drawing Sheets

NETWORK SYSTEM, NETWORK CONTROL METHOD, AND PROGRAM

TECHNICAL FIELD

The present invention relates to a network system, network control method, and a program used therewith, for the purpose of executing processes in response to requests from clients connected with a server over a network.

BACKGROUND OF THE INVENTION

Before now, FTP (File Transfer Protocol) servers have been used to store data and deliver (download) that data over a network to clients when the clients request a download of that data.

When many clients request, to the FTP server, downloads of data on the FTP server within a certain period of time, a load in excess of the processing capacity of the FTP server is applied to the FTP server for the provision of the data to the clients; and sometimes the FTP server is unable to deliver the data in response to the data download requests from the clients.

As a result, for the FTP server to be able to transmit data in response to data download requests from many clients, resources on the FTP server side are expanded and the processing capacity thereof increased by techniques such as augmenting the CPU, memory, and the like comprised by the FTP server, or by distributing the requests from the clients and providing the data using a multiplicity of FTP servers.

However, no matter how greatly the FTP server resources are expanded and the processing capacity of the FTP server increased, the problem remains of the load becoming high due to a temporary spike in requests from clients. Moreover, during the execution of download processing from a server to many clients, it will sometimes happen that, depending on the capacity of the network circuits to which the server is connected, this capacity will form a bottleneck and good downloads to clients cannot be performed, no matter how great the processing capacity of the server.

Meanwhile, in recent years, the number of clients requesting data downloads from FTP servers has been increasing with the growth of the Internet and the spread of high speed communications means. The capacity of data provided by FTP servers has also been increasing. For this reason, the load on FTP servers is rapidly becoming high. Under such conditions, if data download requests from clients are concentrated at an FTP server beyond the processing capacity of the FTP server or the capacity of the network to deliver data to the clients, the FTP server will become unable to deliver data in response to these client requests.

This problem is not limited to the case of clients downloading data from FTP servers, and similarly occurs, for example, when clients request processes such as calculations from a server and the server executes the processes in response to these requests.

DISCLOSURE OF THE INVENTION

In consideration of such circumstances, the inventors noticed that users who intend to acquire data stored in an FTP server, for example, estimate a time window in which download requests will not be concentrated at the FTP server and perform operations so that the data download requests will be made again to the FTP server, and that the load on the server is relatively low outside the time window in which client download or processing requests are concentrated.

It is an object of the present invention to provide a network control method, network system, and program used therewith, free of problems wherein the server is unable to deliver data or execute processing without the augmentation of the server, and without the user himself having to select a time at which processing requests are not concentrated for the processing requests from the client to the server to be performed.

A first aspect of the present invention is a network system connected with a plurality of clients over a network and having process executing means for executing processing requested from each client, comprising:

process request controlling means; and load distributing means for selectively connecting the clients requesting processing with the process executing means or the process request controlling means, based on the processing situation in the process executing means, or the usage situation of the network circuits connected with the process executing means;

wherein the process request controlling means rejects requests relating to the processing from the clients, while indicating to the clients re-request timing, for the clients to make the requests again, based on predetermined conditions.

According to the present invention, a network system, connected with a plurality of clients over a network and having process executing means for executing processes requested by each client, comprises process request controlling means and load distributing means for selectively connecting the clients requesting processing with the process executing means or the process request controlling means, based on the processing situation in the process executing means, or the usage situation of the network circuits connected with the process executing means. The process request controlling means rejects requests relating to the processing from the clients, while indicating to the clients re-request timing, for the clients to make the requests again, based on predetermined conditions.

Specifically, the load distributing means selects the server to connect with the client based on the processing situation in the process executing means or the usage situation of the network circuits connected with the process executing means. For example, when the processing load on the process executing means and the usage situation of the network circuits allow for the execution of the process requested by the client, the process executing means is selected; and in cases such as those wherein when the load on the process executing means or the usage situation of the network circuits exceeds a predetermined load and it is not desirable that the process be performed, the process request controlling means is selected. Thereby, in cases such as those wherein the processing load on the process executing means is so high that processing cannot be executed, processing is not executed by the process executing means; instead, the process request controlling means connected to the client can reject the client's processing request, while indicating to the client, which made the processing request, the timing for the client to make that request again, based on predetermined conditions. The rejection of the processing request in this case presupposes that the processing request can be made again by the client based on predetermined conditions, includes the temporary aborting, interruption, delay, and suspension of the processing request, and further includes a mode for processing so as to make a formal response to the processing request while substantially rejecting the processing request from the client. For example, the process request controlling means further includes a mode for formally executing the processing request for the client by downloading to the client data which is markedly less than the requested file data, for a download request from a client for some file data, and afterwards once again executing the download request for the actually requested file data to the client when predetermined conditions are satisfied.

The present invention according to a second aspect is a network system connected with a plurality of clients over a network, and connected with process executing means for executing processes requested by each client, comprising: process request controlling means; and
load distributing means for selectively connecting the clients requesting processing with the process executing means or the process request controlling means, based on the processing situation in the process executing means, or the usage situation of the network circuits connected with the process executing means; and in that,
the process request controlling means reject requests relating to the processing from the clients, while indicating to the clients re-request timing, for the client to make the request again, based on predetermined conditions.

According to the present invention, a network system connected with a plurality of clients over a network, and connected with process executing means for executing processes requested from each client, is such that the network system comprises process request controlling means and load distributing means for selectively connecting the clients requesting processing with the process executing means or the process request controlling means, based on the processing situation processing means in the process executing means, or the usage situation of the network circuits connected with the process executing means. The process request controlling means rejects requests relating to the processing from the clients, while indicating to the clients re-request timing, for the clients to make the requests again, based on predetermined conditions.

Specifically, the load distributing means select the server to connect with the client based on the processing situation in the process executing means or the usage situation of the network circuits connected with the process executing means. For example, when the processing load on the process executing means and the load on the network circuits allow for the execution of the process requested by the client, the process executing means is selected; and when the load on the process executing means or the load on the network circuits exceeds a predetermined load and it is not desirable that the process be performed, the process request controlling means is selected. Thereby, in cases such as those wherein the processing load on the process executing means is so high that processing cannot be executed, processing is not executed by the process executing means; instead, the process request controlling means connected to the client can reject the client's processing request, while indicating to the client the timing for the client to make that request again, based on predetermined conditions.

The present invention according to a third aspect is characterized in that the process request controlling means of the network system of the first or second aspects indicates the re-request timing by delivering to the client a re-request program for causing the client to make the request again.

According to the present invention, the process request controlling means of the network system of the first or second aspects indicates the re-request timing by delivering to the client a re-request program for causing the client to make the request again.

Specifically, the re-request program, for causing the clients which requested processing to make the processing request again, is delivered to each client according to the processing situation on the process executing server or the usage situation of the network circuits connected to the process executing means, for example, in cases such as those wherein the processing load on the process executing means or the load on the network circuits connected to the process executing means is so high that processing cannot be executed. By receiving and running the re-request program, the client can execute the re-request process when the predetermined conditions have occurred.

The present invention according to a fourth aspect is characterized in that the process request controlling means of the network system of any one of the first to third aspects indicates to the client the re-request timing with the passage of a predetermined time period from a reference time, or a predetermined time, as the predetermined conditions.

According to the present invention, the process request controlling means of the network system according to any one of the first to third aspects indicates to the client the re-request timing with the passage of a predetermined time period from a reference time, or a predetermined time, as the predetermined conditions.

Specifically, the client can make the download request upon the passage of a predetermined period of time from a reference time, or at a predetermined time. Here, the reference time is the time when the client first made the request, a predetermined time, or the like.

The present invention according to a fifth aspect is characterized such that the process request controlling means of the network system of any one of the first to fourth aspects accepts a desired re-request timing from the user and indicates to the client the re-request timing with the predetermined conditions further being the re-request timing selected by the user.

According to the present invention, the process request controlling means of the network system of any of the first to fourth embodiments accepts a desired re-request timing from the user and indicates to the client the re-request timing with the predetermined conditions further being the user's selected re-request timing.

Specifically, by the user selecting a desired time to make a processing request again through the client, the user's desired re-request timing is accepted by the process request controlling means from the client. Then, due to the client being caused to make the processing request again with the user's selected re-request timing as the predetermined conditions, the client can request that the process executing means process this again at the desired re-request timing of the user who is operating the client. In this specification, "timing" is a generic term for temporal concepts including a predetermined time, a predetermined time window, or relative time from a given time, which is later by a desired amount than a given time.

The present invention according to a sixth aspect is characterized in that the process request controlling means of the network system recited in any one of the first to third aspects indicates the re-request timing by transmitting a signal indicating that the request be made again to the client that requested processing.

According to the present invention, the process request controlling means of the network system, recited in any one of the first to third aspects indicates the re-request timing by transmitting a signal indicating that the request be made again to the client that requested processing. Specifically, the process request controlling means instructs the client to make the processing request again by transmitting a signal to the client which requested processing. Thereby, the client can request processing of the process executing server once more according to the instruction from the process request controlling means.

The present invention according to a seventh aspect is characterized such that the process request controlling means of the network system of the sixth aspect comprises request storing means for storing each client which requested processing; and the indication of the re-request timing is the transmission of a signal indicating that the request be made again in the order of storage in the request storing means.

According to the present invention, the process request controlling means of the network system of the sixth aspect comprises request storing means for storing each client which requested processing; and the indication of the re-request timing is the transmission of a signal indicating that the request be made again in the order of storage in the request storing means.

Specifically, the re-request delivery signal is transmitted to each client that requested processing from the process request controlling means in the order in which the clients were stored in the request storing means. In this way, the process request controlling means can transmit signals instructing each client to make the request again to the process executing means, in the order in which the clients requested processing.

The present invention according to an eighth aspect is a network control method for causing process executing means connected with a plurality of clients over a network to execute processes requested by each client, comprising the steps of:
selectively connecting the client that requested processing to the process executing means or process request controlling means, based on the processing situation in the process executing means, by the load distributing means; and
indicating to the client that requested the processing, by the process request controlling means, the re-request timing for making the request again, based on predetermined conditions.

According to the present invention, in a network control method for causing process executing means connected to a plurality of clients over a network to execute processes requested by each client, the clients that requested the processing are selectively connected to the process executing means or process request controlling means, by the load distributing means, based on the processing situation in the process executing means. With the process request controlling means, the re-request timing for making the request again, is indicated to the client that requested the processing based on predetermined conditions.

Specifically, the load distributing means selects whether to connect the process executing means or process request controlling means with the client, based on the processing situation in the process executing means. For example, when the processing load on the process executing means allows for the execution of the processing requested by the client, the process executing means is selected; and in cases such as those wherein the load on the process executing means exceeds a predetermined load and the process cannot be executed, the process request controlling means is selected. Thereby, according to the processing situation in the process executing means or the usage situation of the network circuits connected with the process executing means, for example, in cases such as those wherein the processing load on the process executing means or the load on the network circuits is so high that the processing cannot be executed, the process is not executed by the process executing means; instead, the process request controlling means connected to the clients can indicate, to the clients that requested processing, the timing for the clients to make the request again, based on predetermined conditions.

The present invention according to a ninth aspect is a program transmitted from a process request controlling means to a client, in a network system comprising process executing means for executing processes requested by clients through a network, process request controlling means for rejecting requests relating to processing from the clients while indicating re-request timing for the clients to make the requests again based on predetermined conditions, and load distributing means for selectively connecting the clients that requested the processing to the process executing means or process request controlling means, based on the processing situation in the process executing means or the usage situation of network circuits connected with the process executing means, characterized by causing the client to function as means for making the request again when the re-request timing is determined to have arrived.

According to the present invention, a program transmitted from the process request controlling means to the client, in a network system comprising process executing means for executing processes requested by clients through a network, process request controlling means for rejecting requests relating to processing from the clients while indicating re-request timing for the clients to make the requests again based on predetermined conditions, and load distributing means for selectively connecting the clients that requested the processing to the process executing means or process request controlling means, based on the processing situation in the process executing means or the usage situation of the network circuits connected with the process executing means, causes the client to function as means for making the request again when the re-request timing is determined to have arrived.

Specifically, by this program being executed on the client, the user operating the client does not have to perform an operation on the client to request that the process executing means process again; and the client can automatically request a process according to the re-request timing.

BRIEF DESCRIPTION OF THE DRAWINGS

FIG. 3 is a flowchart showing an example of the process sequence for the data providing system shown in FIG. 2 to provide a file to the client 10a.

FIG. 4 is a flowchart showing an example of the process sequence for the data providing system shown in FIG. 2 to provide a file to the client 10a.

PREFERRED EMBODIMENTS OF THE INVENTION

First Embodiment of the Present Invention

A first embodiment of the present invention is described below with reference to FIG. 1 through FIG. 4.

Figure 1:
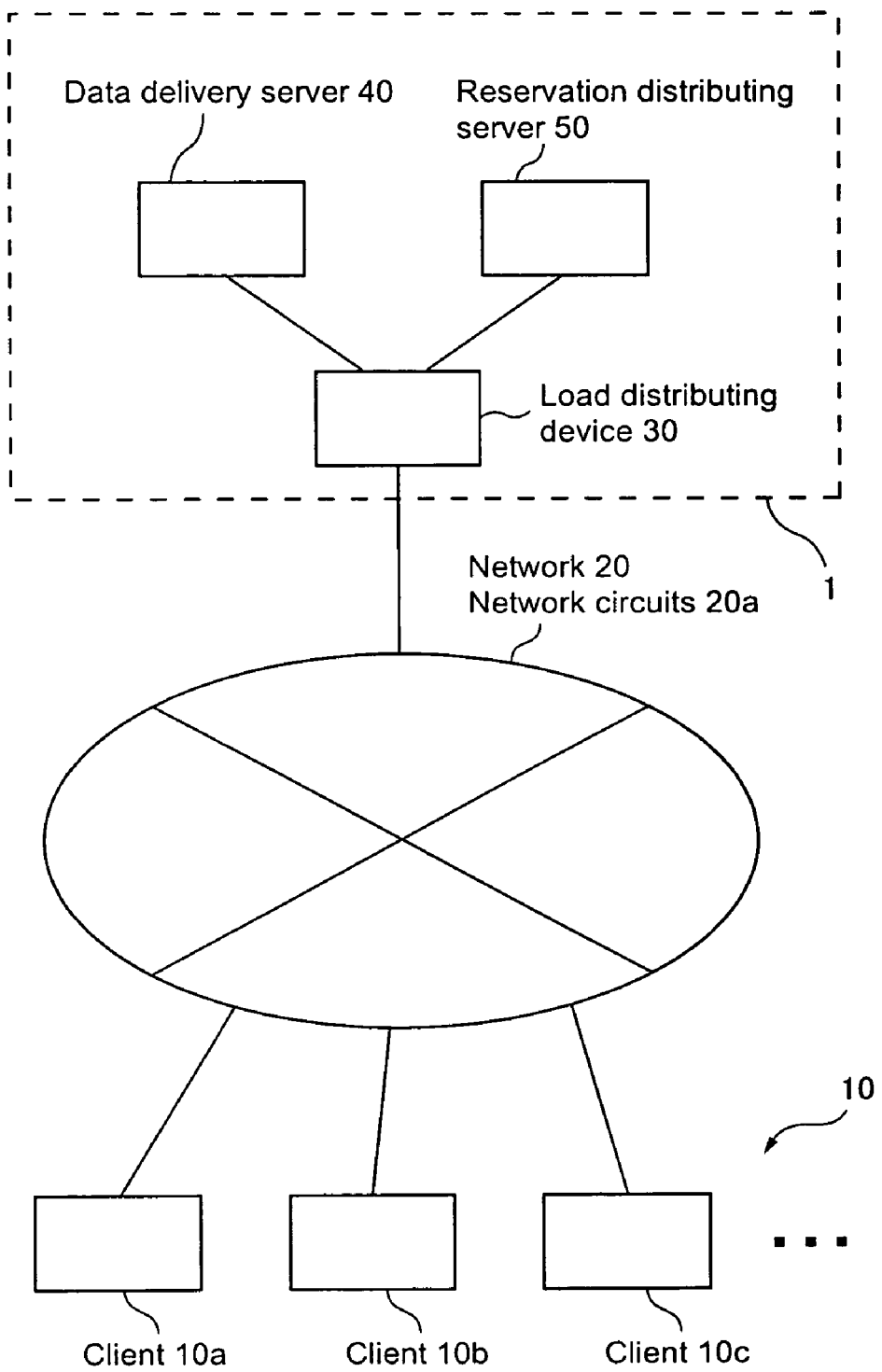
FIG. 1 is a schematic view of a data providing system and clients connected to the data providing system according to a first embodiment of the present invention.

FIG. 1 is a schematic view showing a data providing system 1 and clients connected to the data providing system 1, which is a network system according to the first embodiment of the present invention.

As shown in FIG. 1, the data providing system 1 relating to the first embodiment of the present invention comprises a load distributing device 30 which functions as load distributing means, a data delivery server 40 which functions as process executing means, and a reservation distributing server 50 which functions as process request controlling means, and this is connected to clients 10 over a network 20 such as the Internet. Moreover, the data delivery server 40 is an FTP server, for example; the clients 10 are terminal devices comprising communications means or connected with communications means, such as general purpose computers, personal computers, portable terminals, portable telephones, or the like.

The load distributing device 30 is connected between the network 20, and the data delivery server 40 and reservation distributing server 50, and mediates the connection between the clients 10, data delivery server 40, and reservation distributing server 50. The load distributing device 30 receives the download request when a download request, to request the transmission of a file such as an application provided by the data delivery server 40, is transmitted by a client. Thereafter, the load distributing device 30 selectively connects the client 10 to either the data delivery server 40 or reservation distributing server 50, depending on the status of the data delivery server 40 or the usage situation (traffic, for example) of the network circuits 20a connected with the data delivery server 40.

Specifically, by periodically receiving from the data delivery server 40 information showing the situation of the processing load on the data delivery server 40 or the usage situation of the network circuits 20a connected with the data delivery server 40, the load distributing device 30 determines whether the data delivery server 40 can deliver a file stored on the data delivery server to the client 10 or whether there is an impediment to delivery. Here, when the load distributing device 30 determines that the data delivery server 40 is able to transmit a file stored on the data delivery server to the client 10, the load distributing device 30 connects the client 10 to the data delivery server 40.

On the other hand, when the load distributing device 30 determines that there is an impediment to the delivery of the file stored on the data delivery server to the client 10 for a reason such as there being many requests from clients 10 and the processing load on the data delivery server 40 or the load on the network circuits 20a exceeds a predetermined load, the load distributing device 30 connects the client 10 to the reservation distributing server 50. Moreover, such functions of the load distributing device 30 are implemented with a device such as a load balancer, a device called an L4/L7 switch, or a device comprising those devices.

The data delivery server 40 contains file data (hereinafter, simply "files") such as applications or the like. When this data delivery server 40 is connected with a client 10 by the load distributing device 30, the data delivery server 40 delivers the stored files according to the download request from the client. Also, the data delivery server 40 periodically transmits, to the load distributing device 30, information showing the situation of the processing load on the data delivery server 40 itself and the usage situation of the network circuits 20a connected thereto, due to the delivery of file data to the clients 10.

The load distributing device 30 determines, from the processing load on the data delivery server 40 and/or the usage situation of the network circuits 20a, whether the status is such that the file can be delivered from the data delivery server 40 to the client 10 without any problems; an example thereof is given below.

When the determination described above is made according to the processing load on the data delivery server 40, the usage rate of sites which might form bottlenecks within the data delivery server 40, such as the CPU or memory, is used as the basis for the determination and there is determined to be an impediment to delivery when this usage rate is in excess of a predetermined value.

Meanwhile, when such a determination is made according to the usage situation of the network circuits 20a, the utilization rate of the bandwidth of the network circuits 20a becomes the basis for that determination and there is determined to be an impediment to delivery when this utilization rate reaches a predetermined percentage of the bandwidth. The number of clients presently connected to the data delivery server may also be the basis for the determination; and an impediment to delivery is determined to exist when a predetermined number of connections is exceeded. The various determinations described above may also be combined.

The reservation distributing server 50 contains reservation programs. The reservation program is a program which causes the client 10 to make the download request again at the re-request timing. The re-request timing in the reservation program is the time window, for which it is estimated that there are few download requests and the processing load on the data delivery server 40 is small, based on statistics and the like for times at which clients made download requests in the past, and a predetermined time selected from within that time window. A plurality of re-request timings are selected and a reservation program is prepared for each re-request timing. In practice, the re-request timing may also be a time after a predetermined time has passed since the download request, and specifically a time after the passage of N hours or N minutes (N is a positive number), designated by the client 10.

The reservation distributing server 50, which is connected by the load distributing device 30 to the clients 10, rejects download requests from the clients 10, while delivering the reservation programs to the clients 10 in order of re-request timing.

When the re-request timings in the reservation programs delivered to a plurality of clients 10 are all identical, the data delivery server 40 will again receive a cluster of download requests from the clients 10 at that re-request timing. As a result, there is a risk that the processing load on the data delivery server 40 and the circuit load will become high and the files cannot be provided to the clients 10. So that this does not occur, a plurality of predetermined times, specifically re-request timings, are prepared for the reservation programs on the reservation distributing server. Also, the reservation distributing server is limited in the number of re-request programs, for making requests again that the same time, that it can deliver, in consideration of the number of requests that the data delivery server 40 can process without difficulty. Moreover, the re-request programs are stored and, when the re-request programs are delivered or when the delivery limit described above is exceeded, re-request programs with modified re-request timings may be generated and stored on the reservation distributing server.

As described above, the load distributing device 30 receives download requests from the clients 10 and when it is determined that the data delivery server 40 cannot deliver the files without impediment, the load distributing device 30 connects the clients 10 making download requests to the reservation distributing server 50 instead of the data delivery server 40, and the reservation distributing server 50 delivers reservation programs to the clients 10.

By running the reservation programs, the clients 10 which received these reservation programs automatically make the download requests to the data delivery server 40 again, upon the re-request timing at which it is estimated that the processing load on the data delivery server 40 is low. As a result, if the data delivery server 40 is not able to deliver files, the reservation program estimates the time at which the processing load on the data delivery server 40 is low, and automatically makes the download request to the data delivery server 40 again; therefore, the users can easily download files through the clients 10 without having to operate the clients to make a download request again.

Figure 2:
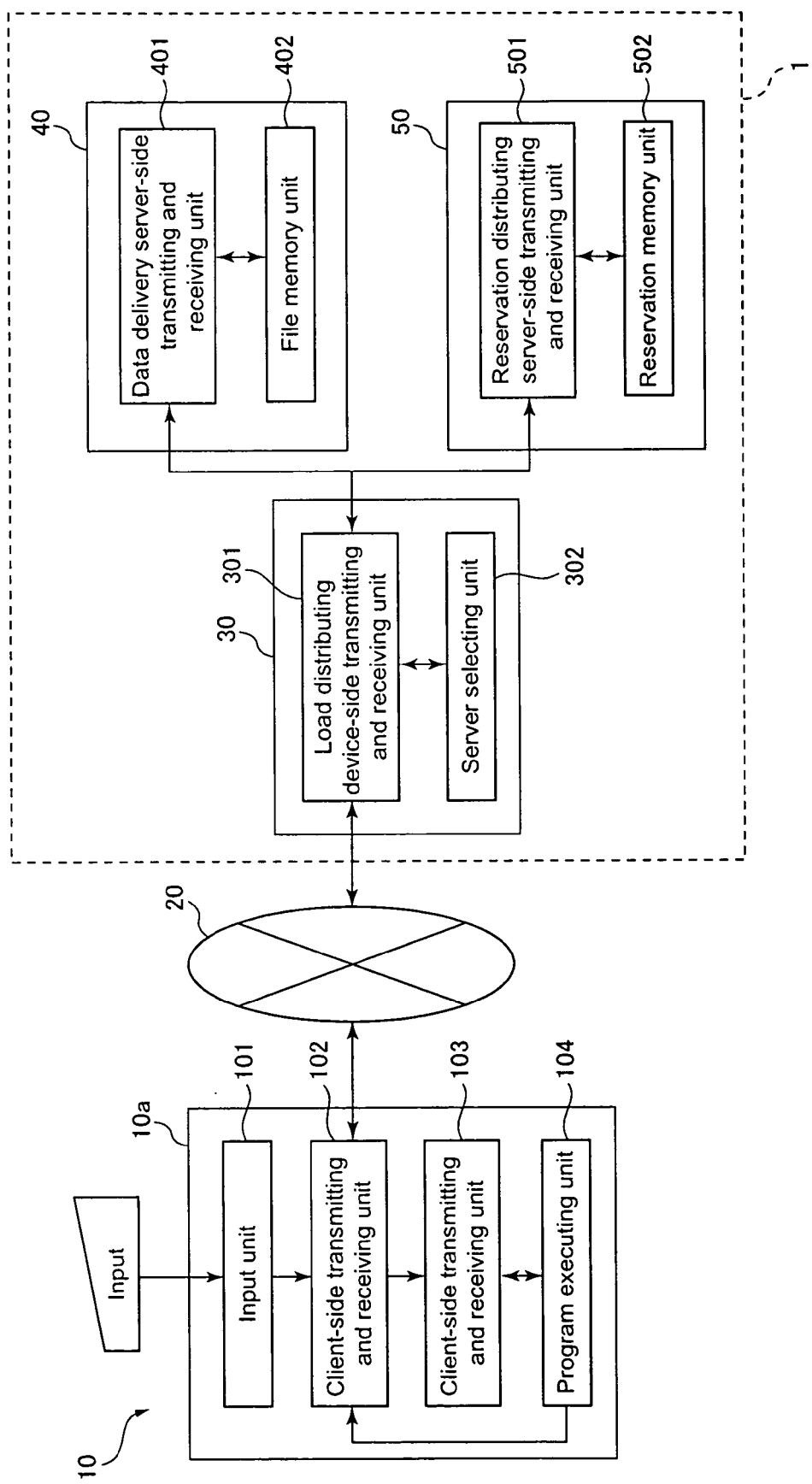
FIG. 2 is a functional block diagram showing the principal functions of the data providing system and a client shown in FIG. 1.

Next, the functions of the data providing system 1 and clients 10 shown in FIG. 1 are described using FIG. 2. FIG. 2 is a functional block diagram showing an example of the principle functions of the data providing system 1 and clients 10 shown in FIG. 1. The example described here is a case where the client 10*a* shown in FIG. 1 makes a download request.

The client 10*a* comprises an input unit 101, a client-side transmitting and receiving unit 102, a client-side memory unit 103, and a program executing unit 104. The input unit 101 accepts a download command for executing a download request input by the user to the client 10*a*, and transmits the download command to the client-side transmitting and receiving unit 102. The client-side transmitting and receiving unit 102 functions as a transmitting and receiving unit, receives the download command from the input unit 101, and issues a download request to the load distributing device 30 according to the download command.

The client-side transmitting and receiving unit 102 is connected to the data delivery server 40 through a network 20 and receives files, when the data delivery server 40 is able to deliver files without impediment. Moreover, the client-side receiving unit 102 is connected with the reservation distributing server 50 through the network 20 and receives the reservation program, when the data delivery server 40 has some impediment to file delivery. Then, the client-side receiving unit 102 makes a download request to the load distributing device 30 at the predetermined time, according to the reservation program.

The client-side memory unit 103 is implemented with memory or the like, stores the reservation program received by the client-side transmitting and receiving unit 102, and permanently retains the reservation program while the reservation program is run by the program executing unit 104. The program executing unit 104 functions as transmission and reception controlling means, sequentially executes the reservation program stored in the client-side memory unit 103, and makes the download request to the data delivery server 40, through the load distributing device 30, from the client-side transmitting and receiving unit 102 at the re-request timing.

The load distributing device 30 comprises a load distributing device-side transmitting and receiving unit 301 and a server selecting unit 302. The load distributing device-side transmitting and receiving unit 301 receives the download request from the client-side transmitting and receiving unit 102, and connects the client-side transmitting and receiving unit 102, which made the download request, to the data delivery server 40 or the reservation distributing server 50, either one of which was selected by the server selecting unit 302. Moreover, the load distributing device-side transmitting and receiving unit 301 periodically receives information showing the state of the processing load on the data delivery server 40 from the data delivery server 40, and transmits to the server selecting unit 302 the received information showing the state of the processing load on the data delivery server 40.

The server selecting unit 302 receives information showing the state of the processing load on the data delivery server 40 from the load distributing device-side transmitting and receiving unit 301, and selects the server to connect with the client-side transmitting and receiving unit 102, from either the data delivery server 40 or the reservation distributing server 50, based on that information. For example, when the received information showing the situation of the processing load on the data delivery server 40 indicates that files can be delivered without impediment, the server selecting unit 302 selects the data delivery server 40. When the received information showing the state of the processing load on the data delivery server 40 indicates that the processing load on the data delivery server 40 is great enough to be an impediment to file delivery, the server selecting unit 302 selects the reservation distributing server 50. Thereupon the load distributing device-side transmitting and receiving unit 301 connects the client-side transmitting and receiving unit 102 and the selected server 40.

The data delivery server 40 comprises a data delivery server-side transmitting and receiving unit 401 and a file memory unit 402. The data delivery server-side transmitting and receiving unit 401 reads files stored in the file memory unit 402 when connected with the client-side transmitting and receiving unit 102 by the load distributing device-side transmitting and receiving unit 301. Then, the data delivery server-side transmitting and receiving unit 401 transmits the file through the load distributing device 30 to the client-side transmitting and receiving unit 102. Also, the data delivery server-side transmitting and receiving unit 401 periodically transmits information showing the state of the processing load on the data delivery server 40 to the load distributing device-side transmitting and receiving unit 301. The file memory unit 402 stores files to be provided to the clients 10.

The reservation distributing server 50 comprises a reservation distributing server-side transmitting and receiving unit 501 and a reservation memory unit 502. When connected to the client-side transmitting and receiving unit 102 by the load distributing device-side transmitting and receiving unit 301, the reservation distributing server-side transmitting and receiving unit 501 rejects download requests from the client 10*a*, while reading the reservation program stored in the reservation memory unit 502. The reservation distributing server-side transmitting and receiving unit 501 then transmits the reservation program to the client-side transmitting and receiving unit 102 through the load distributing device 30, in response to the download request.

Figure 3:
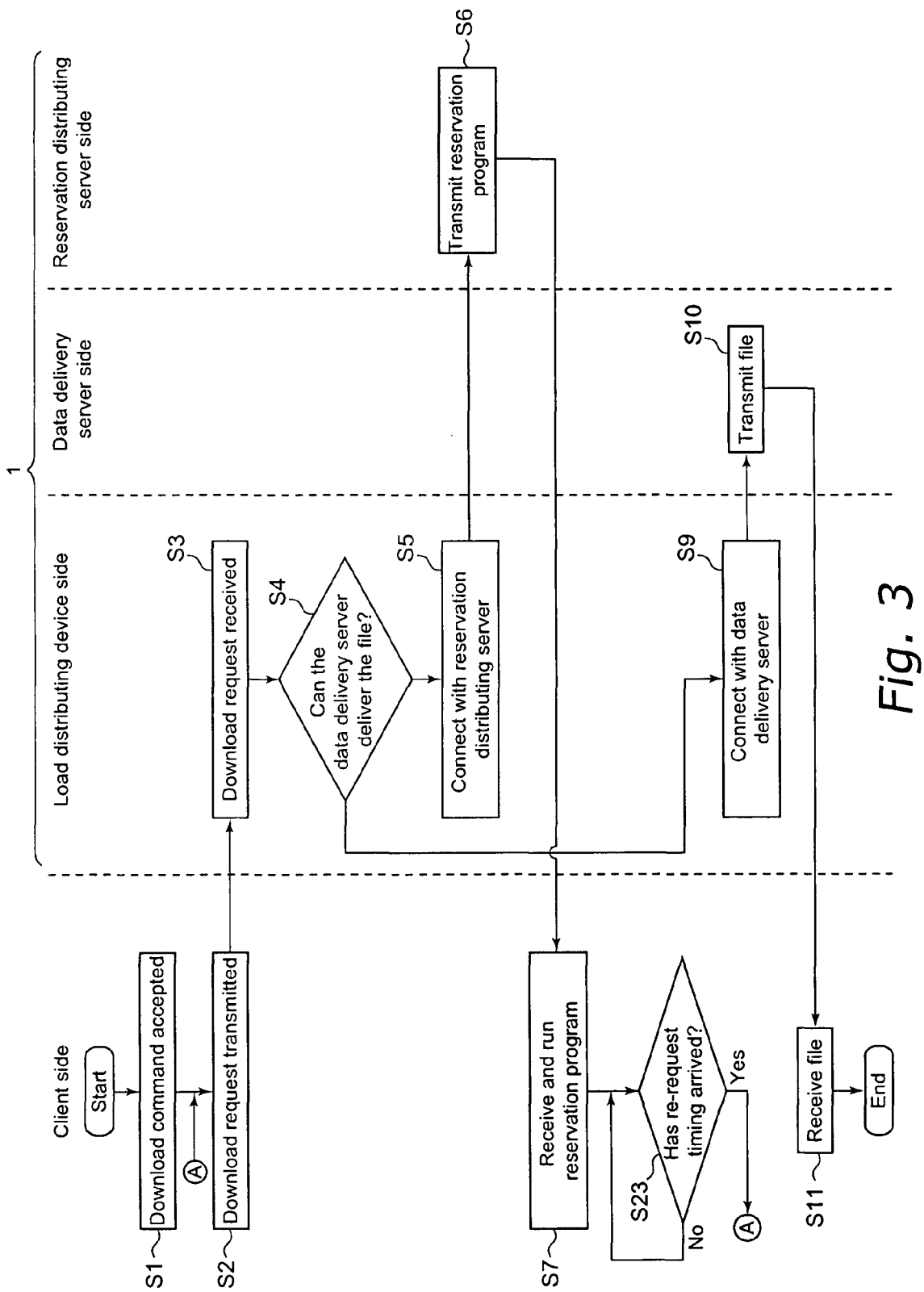

The process sequence to provide a file to the client 10*a* for the data providing system 1 that is shown in FIG. 2 is described below using FIG. 2 and FIG. 3. FIG. 3 is a flowchart showing an example of the process sequence for the data providing system 1 shown in FIG. 2 to provide a file to the client 10a.

First, in Step S1, the input unit 101 of the client 10a accepts the download command input by the user. The input unit 101 transmits the accepted download command to the client-side transmitting and receiving unit 102. The client-side transmitting and receiving unit 102 that received the download command transmits a download request to the load distributing device 30 in accord with the download command (S2).

The download request transmitted in Step S2 is received by the load distributing device-side transmitting and receiving unit 301 (S3). The download request is transmitted from the load distributing device-side transmitting and receiving unit 301 to the server selecting unit 302. When the server selecting unit 302 receives the download request, the server selecting unit 302 determines whether the data delivery server 40 can transmit the file without impediment, based on the information showing the state of the processing load on the data delivery server 40 or the usage situation of the network circuits 20a, periodically received from the data delivery server-side transmitting and receiving unit 401 (S4).

When it is not determined that the data delivery server 40 can transmit the file without impediment (NO in S4), the server selecting unit 302 selects the reservation distributing server 50 and connects the client-side transmitting and receiving unit 102 with the reservation distributing server 50 via the load distributing device-side transmitting and receiving unit 301 (S5). At this time, the reservation distributing server-side transmitting and receiving unit 501 rejects the download request from the client 10a, while reading the reservation program stored in the reservation memory unit 502 and transmitting the reservation program via the load distributing device-side transmitting and receiving unit 301 to the connected client-side transmitting and receiving unit 102 (S6).

Thereupon, in the client-side transmitting and receiving unit 102, the client-side transmitting and receiving unit 102 receives the reservation program from the reservation distributing server-side transmitting and receiving unit 501 and stores the reservation program in the client-side memory unit 103. The program executing unit 104 then runs the reservation program stored in the client-side memory unit 103 (S7). The program executing unit 104 reads the time at each predetermined period according to the running reservation program, and determines whether the re-request timing has been reached (S8). Note that, when the reservation program is running, an advertisement may also be displayed on a display screen, not shown. This display provides the reservation program with the function of an advertisement medium. This display also becomes an indicator to make the user aware that the reservation program is running.

When the re-request timing is not determined to have been reached (NO in S8), Step S8 is repeatedly executed until the re-request timing is determined to have been reached. When the re-request timing is determined to have been reached (YES in S8), Step S2 is executed and the program executing unit 104 causes the client-side transmitting and receiving unit 102 to execute the download request. Note that, when the re-request timing is determined to have been reached in Step S8, an audio control device, not shown, may also be caused to emit an alarm from speakers, not shown. The user can thereby be informed that the download request is being made.

After the download request is made by the client-side transmitting and receiving unit 102, the program executing unit 104 deletes the reservation program in the client-side memory unit 103. With the deletion of the reservation program stored in the client-side memory unit 103, the reservation program, which is not necessary after the download request has been made by the client-side transmitting and receiving unit 102, can be cleared from the client-side memory unit 103, without the user performing an operation on the client 10a to delete the reservation program. As a result, the available memory (open space) in the client-side memory unit 103 can be prevented from becoming unnecessarily small due to the storing of unnecessary reservation programs.

If the power source that provides power to the client 10a is OFF at the re-request timing, the program executing unit 104 cannot determine that the re-request timing has been reached at the re-request timing in Step S8. Even in such a case, if the power source for supplying power to the client 10A goes ON at a time after the re-request timing, the program executing unit 104 will read in the time at each predetermined period from the time when the power supply went ON and determine whether the re-request timing has been reached.

In this case, the predetermined time period initially read at the time when the power supply went ON has already reached the re-request timing, the re-request timing is determined to have been reached in Step S8. As a result, even if the user cannot turn ON the power supply for the client 10a at the re-request timing, Step S2 is executed when the user turns ON the power supply, and the program executing unit 104 can cause the client-side transmitting and receiving unit 102 to execute a download request.

The download request transmitted from the client-side transmitting and receiving unit 102 in Step S2 is received by the load distributing device-side transmitting and receiving unit 301 in Step S3. Then, in Step S4, the server selecting unit 302 determines whether the data delivery server 40 can deliver a file without impediment, based on the information showing the state of the processing load on the data delivery server 40 transmitted periodically from the data delivery server-side transmitting and receiving unit 401.

Here, when it is determined that the data delivery server 40 cannot deliver a file without impediment (NO in S4), Step S5 is executed again, the client-side transmitting and receiving unit 102 and reservation distributing server-side transmitting and receiving unit 501 are connected via the load distributing device-side transmitting and receiving unit 301, and the reservation program is transmitted to the client-side transmitting and receiving unit 102 by the reservation distributing server-side transmitting and receiving unit 501 (S6).

With the process described above, if the user inputs a download command to the input unit 101 of the client 10a once, the download request can be repeatedly transmitted from the client-side transmitting and receiving unit 102 until the file is received, even if the download command is not input again. In other words, the user who wants to acquire a file through the client 10a does not need to input the download command to the client 10a many times before the data delivery server 40 becomes able to deliver the file.

The case where the server selecting unit 302 determines that the data delivery server 40 is able to deliver a file without impediment in Step S4 is explained below.

When it is determined that the data delivery server 40 can deliver a file without impediment (YES in S4), the server selecting unit 302 selects the data delivery server 40, and connects the client-side transmitting and receiving unit 102 with the data delivery server-side transmitting and receiving unit 401 via the load distributing device-side transmitting and receiving unit 301 (S9).

The data delivery server-side transmitting and receiving unit 401 reads the file stored in the file memory unit 402 to the connected client-side transmitting and receiving unit 102, and transmits the file to the connected client-side transmitting and receiving unit 102 via the load distributing device-side transmitting and receiving unit 301 (S10). The client-side transmitting and receiving unit 102 receives the file transmitted in Step S10 (S11). The client-side transmitting and receiving unit 102 stores the received file in the client-side memory unit 103. The downloading of the file by the client 10a is thereby completed and the process ends.

Moreover, when the data delivery server 40 delivers a file in response to a download request by a reservation program, or when the reservation distributing server 50 causes the client 10a to download a reservation program, the data delivery server 40 or reservation distributing server 50 may also grant privileges such as for a game, or the like, and provide the file. Granting these privileges can alleviate the dissatisfaction of the user of the client 10a which made the download request, when the client 10a which made the download request is unable to download the file with the first download request. Needless to say, the privileges granted when the reservation program is downloaded must be such as to have almost no impact on the load.

As described above, the client-side transmitting and receiving unit 102 and the data delivery server-side transmitting and receiving unit 401 can be connected by the load distributing device-side transmitting and receiving unit 301 in Step S9, only when it is determined in Step S4 that the data delivery server 40 can deliver the file without impediment. On the other hand, when it is determined in Step S4 that the data delivery server 40 cannot deliver a file, the client-side transmitting and receiving unit 102 and reservation distributing server 50 can be connected by the load distributing device-side transmitting and receiving unit 301.

As a result, the load distributing device 30 quickly connects the client 10a with the reservation distributing server 50 or data delivery server 40 in response to the load situation on the data delivery server 40; and accordingly the file or reservation program can be quickly provided to the client. The re-request timing, for the client 10a to make the download request again, can thereby be indicated to the client 10a. Moreover, the data delivery server-side transmitting and receiving unit 401 of the data delivery server 40 can exclusively perform processing for file transmission; and the reservation memory unit 502 of the reservation distributing server 50 can exclusively perform processing for reservation program transmission. For this reason, the file or reservation program can be quickly provided to the client 10a.

Above, the reservation program is stored in the reservation distributing server 50 with a re-request timing that is set in advance, but may also be such that the download request is made again after the passage of a predetermined period of time from the time that the user first made the download request.

In this case, specifically, when the data providing system 1 receives the download request from the client 10a, and when processing on the data delivery server 40 is determined to be difficult and the client 10a is connected to the reservation distributing server 50, the time at which the download request was received is captured with a timer (not shown) and the reservation program, with that time attached as information, is delivered to the client 10a. The reservation program in this case has the attached time as the reference time, and will be such that the download request will be made again after the passage of a predetermined period of time from that reference time. In other words, the re-request timing is the time after the passage of a predetermined period of time from the reference time.

The reservation program, whereby the reservation distributing server 50 causes the client 10a to make the download request again after the passage of a predetermined period of time from the reference time, is described below using FIG. 4. The process sequence differs from that shown in FIG. 3 as follows: Steps S6 and S8 are not executed, and Steps S21, S22, and S23 are executed. As described above, the reservation program, wherein the re-request timing is the time after the passage of a predetermined period of time from a time set as the reference time, is stored in the reservation memory unit 502. First, in Step S21, when the reservation distributing server-side transmitting and receiving unit 501 is connected to the client 10a, the connection time is captured with a timer (not shown) and, with the captured time as the reference time, the information showing this reference time is stored in the reservation memory unit 502.

Then, the reservation distributing server-side transmitting and receiving unit 501 attaches the information, showing the reference time stored in the reservation memory unit 502, to the reservation program, and transmits the reservation program stored in the reservation memory unit 502 to the client 10a (S22). In Step S7, the reservation program, received by the client-side transmitting and receiving unit 102, is run. In Step S23, the program executing unit 104 determines whether a predetermined period of time has passed since the reference time. When it is not determined that the predetermined period of time has passed since the reference time (NO in S23), Step S23 is repeated. When it is determined that the predetermined period of time has passed since the reference time (YES in S23), Step S2 is executed and the client-side transmitting and receiving unit 102 transmits the download request again.

Figure 4:
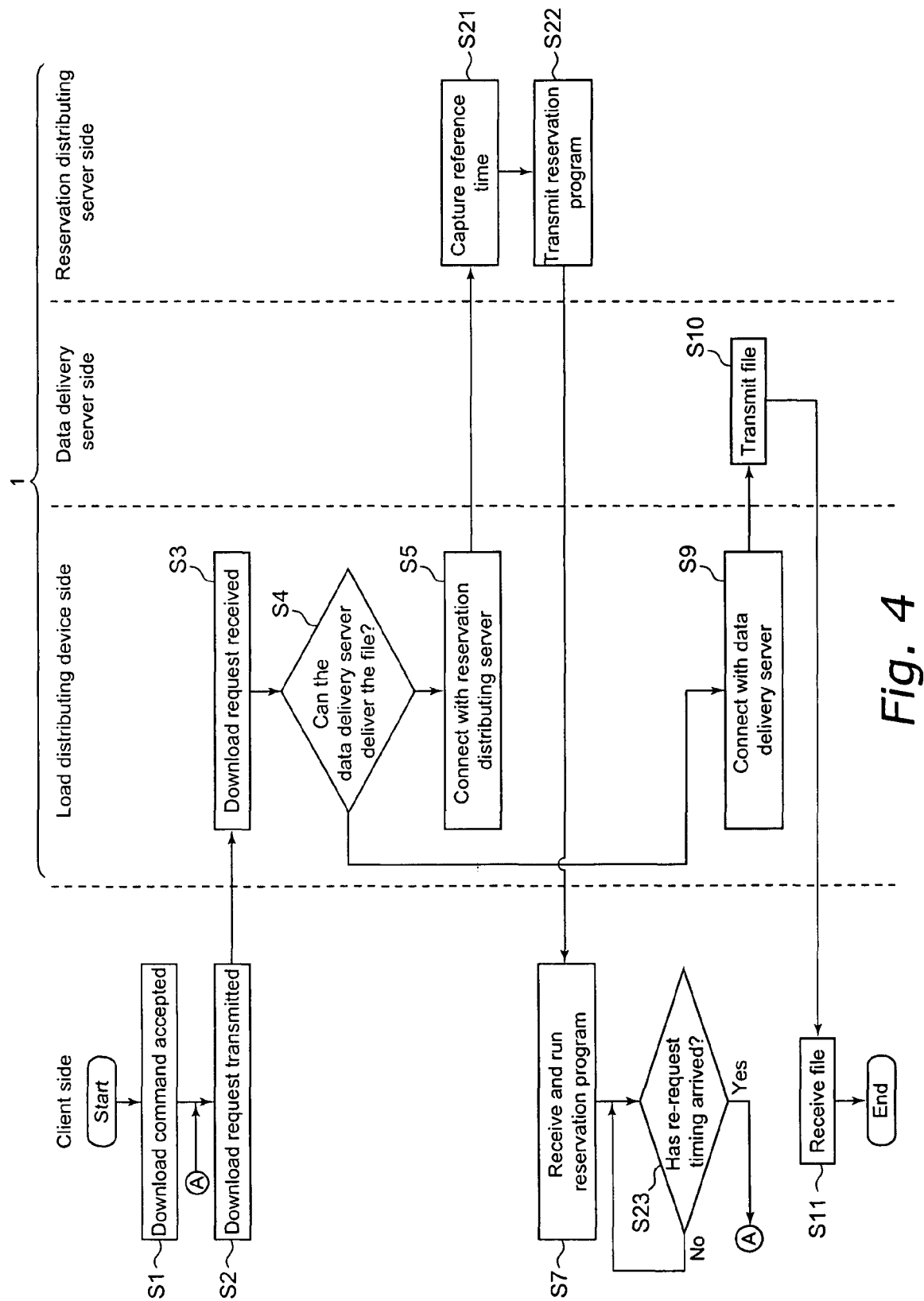

Even with the process sequence shown in FIG. 4, when the data delivery server 40 cannot deliver files, the reservation program estimates the time at which the processing load on the data delivery server 40 is low, and automatically makes the download request again to the data delivery server 40; therefore, the users can easily download files through the clients 10 without having to operate the clients to make the download requests again.

Note that, the reference time is not limited to being the time at which the download request was made, and may also be the time at which the server load is estimated to be low, or the like. Also, instead of attaching time-related information, a reservation program may be generated, wherein the re-request timing is the time after the passage of a predetermined period of time from the time at which the download reservation was received from the client 10. Then, the reservation program may also be stored once in the reservation distributing server and downloaded to the client.

Second Embodiment of the Present Invention

Figure 5:
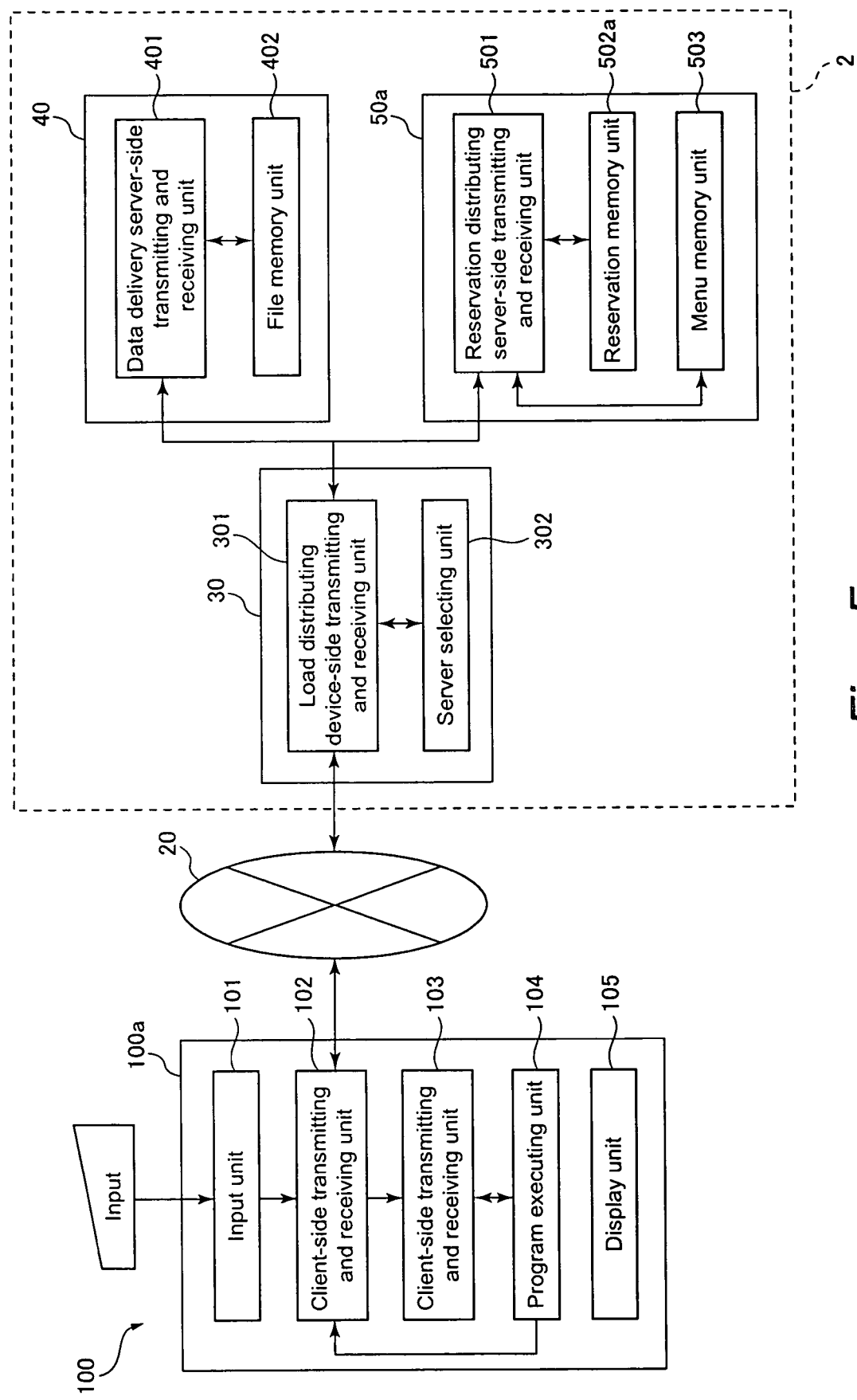
FIG. 5 is a functional block diagram showing the principal functions of a data providing system and a client according to a second embodiment of the present invention.
Figure 6:
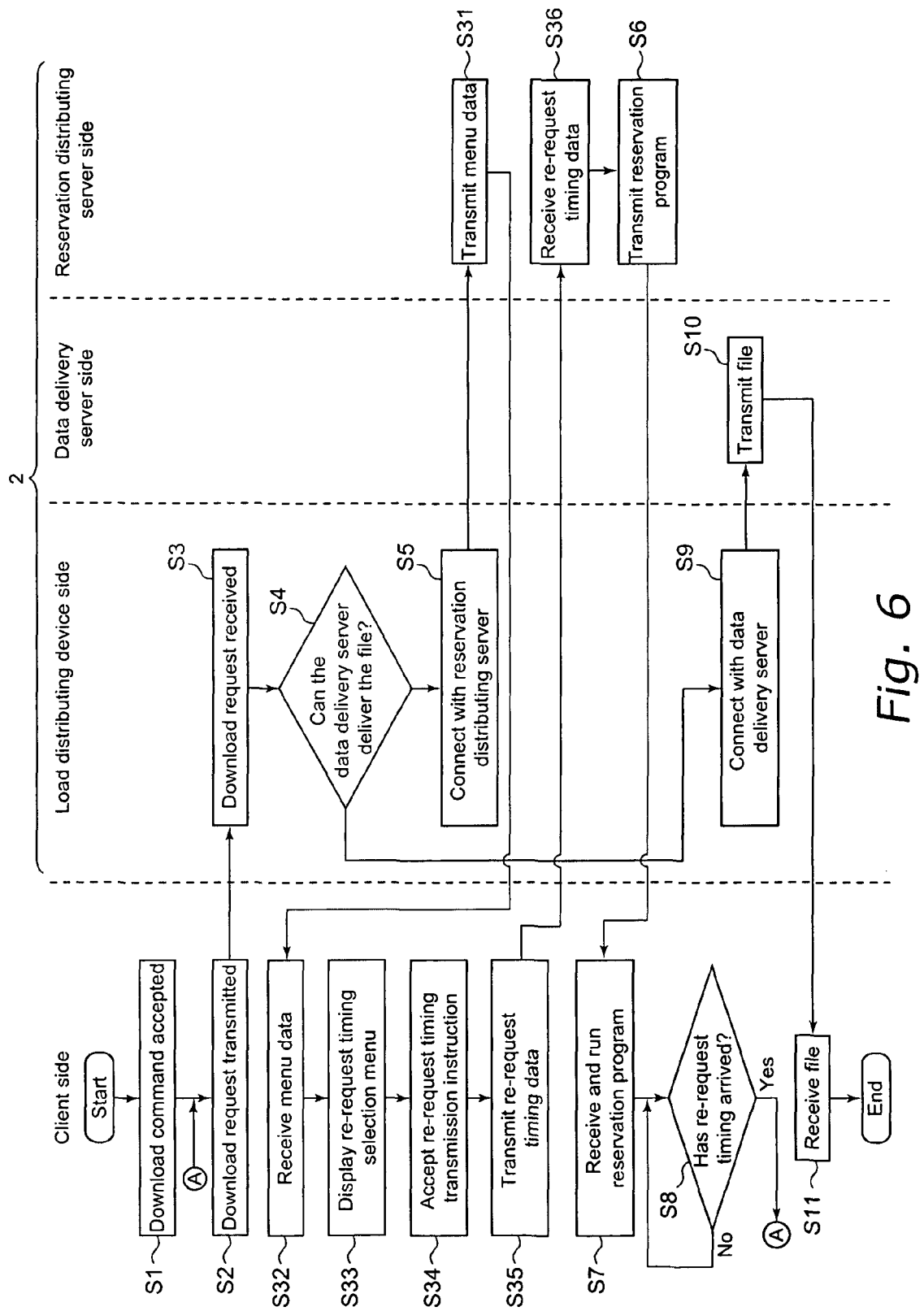
FIG. 6 is a flowchart showing an example of the process sequence for the data providing system shown in FIG. 5 to provide a file to the client.

A data providing system 2, as a network system relating to a second embodiment of the present invention, is described next using FIG. 5 and FIG. 6. The data providing system 2 relating to the second embodiment of the present invention differs from the data providing system 1 relating to the first embodiment of the present invention as follows: in the case where the data delivery server 40 cannot deliver a file without impediment when a client 100 makes a download request, the reservation distributing server 50 delivers a re-request timing selection menu, for selecting as the re-request timing the user's desired predetermined time or time window from a plurality of predetermined times or time windows, to the client 100 which made the download request.

Also, the data providing system 2 relating to the second embodiment of the present invention differs from the data providing system 1 relating to the first embodiment of the present invention as follows: the re-request timing data, showing the re-request timing based on the re-request timing selection menu, is received, and a reservation program causing the client 100 to make the download request at the re-request timing is transmitted to the client 100.

The data providing system 2 relating to the second embodiment of the present invention shares aspects, other than those noted above, with the first embodiment of the present invention, and therefore only those aspects which differ from the data providing system relating to the first embodiment of the present invention are described below. FIG. 5 is a functional block diagram showing the principal functions of a data providing system and clients 100 according to the second embodiment of the present invention.

The example described here is the case where the client 100a makes a download request. Also, the same reference numbers are provided to the functional blocks of the data providing system 2 and client 100a relating to the second embodiment of the present invention, that are the same as the functional blocks of the data providing system 1 and client 10a relating to the first embodiment of the present invention.

The client 100a comprises a display unit 105, in addition to an input unit 101, a client-side transmitting and receiving unit 102, a client-side memory unit 103, and a program executing unit 104. The display unit 105 displays the re-request timing selection menu, based on the menu data transmitted by the reservation distributing server-side transmitting and receiving unit 501 when the data delivery server 40, which will be described hereinbelow, cannot deliver the file.

The re-request timing selection menu is a menu for the user to select the user's desired predetermined time or predetermined time window as the re-request timing. Pre-allocated time windows or predetermined times, from statistics of times when download requests from clients 100 have been concentrated in the past or the like, meaning time windows or predetermined times when it is estimated that download requests from clients 100 are few and the processing load on the data delivery server 40 is low, are selected in advance for the re-request timing selection menu.

The user views the re-request timing selection menu displayed on the display unit 105 and performs an operation on the input unit 101 to select the re-request timing, which is the desired predetermined time or predetermined time window, from among the predetermined times or predetermined time windows displayed on the re-request timing selection menu. The input unit 101 accepts the re-request timing transmission instruction input by the user's operation to select the re-request timing. The re-request timing transmission instruction is an instruction for transmitting the re-request timing data, showing the user's selected re-request timing, from the input unit 101 to the reservation distributing server 50, via the client-side transmitting and receiving unit 102. The client-side transmitting and receiving unit 102 receives the re-request timing transmission instruction via the input unit 101, and transmits the re-request timing data to the reservation distributing server-side transmitting and receiving unit 501, according to the re-request timing transmission instruction.

The reservation distributing server 50a comprises a menu memory unit 503, in addition to a reservation distributing server-side transmitting and receiving unit 501 and a reservation memory unit 502a. The menu memory unit 503 stores the menu data, which is the image data for displaying the re-request timing selection menu described above. The reservation distributing server-side transmitting and receiving unit 501 receives the re-request timing data, showing the user's selected re-request timing, from the client-side transmitting and receiving unit 102, and reads the reservation program, which causes the client 100a to execute the download request again, from the reservation memory unit 502a and transmits this program to the client-side transmitting and receiving unit 102, when the re-request timing shown by the re-request timing data has arrived.

The reservation memory unit 502a stores the reservation program. When read from the reservation memory unit 502a by the reservation distributing server-side transmitting and receiving unit 501, the reservation program is caused by the reservation distributing server-side transmitting and receiving unit 501 to overwrite the program, which causes the client 100a to make the download request again at the re-request timing shown by the re-request timing data received by the reservation distributing server-side transmitting and receiving unit 501.

Here, it may also be the case that the reservation programs, corresponding to each of the predetermined times or predetermined time windows shown on the re-request timing selection menu, are stored in the reservation memory unit 502a; and the reservation distributing server-side transmitting and receiving unit 501 appropriately reads the reservation program, corresponding to the re-request timing shown in the received re-request timing data, from among the reservation programs stored in the reservation memory unit 502a.

In this way, the reservation distributing server-side transmitting and receiving unit 501 transmits menu data to the client 100a, and transmits the reservation program, corresponding to the re-request timing selected by the user based on the menu data, to the client 100a corresponding to the user who selected the re-request timing. The user can thereby cause the client 100a to execute the download request again at the time or time window desired by the user.

The process sequence for the data providing system 2 shown in FIG. 5 to provide a file to the client 100a is described below using FIG. 5 and FIG. 6. FIG. 6 is a flowchart showing an example of the process sequence for the data providing system 2 shown in FIG. 5 to provide a file to the client 100a. In FIG. 6, the same reference numerals are used for steps which are identical to those in the process sequence for the data providing system 1, relating to the first embodiment of the present invention shown in FIG. 3, to provide a file to the client 100a.

In Step S3, the download request is received by the load distributing device 30, as in the process sequence for the data providing system 1, relating to the first embodiment of the present invention and shown in FIG. 3, to provide a file to the client 100a. In Step S4, the load distributing device 30 determines whether the data delivery server 40 can deliver a file. If it is determined that the data delivery server 40 cannot deliver a file, the client-side transmitting and receiving unit 102 and reservation distributing server 50a are connected in Step S5.

In the data providing system 2 relating to the second embodiment of the present invention, thereafter in Step S31, the reservation distributing server-side transmitting and receiving unit 501 rejects the download request from the client 100a, while transmitting menu data stored in the menu memory unit 503 to the client-side transmitting and receiving unit 102. The client-side transmitting and receiving unit 102 receives the menu data from the reservation distributing server-side transmitting and receiving unit 501 and stores the menu data in the client-side memory unit 103 (S32). The program executing unit 104 then generates a re-request timing selection menu, showing the predetermined times or predetermined time windows that the user can select, based on the menu data stored in the client-side memory unit 103 and displays the re-request timing selection menu on the display unit 105 (S33).

The user operates the input unit 101 to select the re-request timing that is the user's desired time from the re-request timing selection menu, whereby the input unit 101 accepts the re-request timing transmission instruction (S34). The client-side transmitting and receiving unit 102 receives the re-request timing transmission instruction via the input unit 101, and transmits the re-request timing data, showing the re-request timing, to the reservation distributing server-side transmitting and receiving unit 501, according to the re-request timing transmission instruction (S35). The reservation distributing server-side transmitting and receiving unit 501 then receives the re-request timing data from the client-side transmitting and receiving unit 102 (S36).

To cause the client 100a to make the download request again at the re-request timing shown by the re-request timing data, the reservation distributing server-side transmitting and receiving unit 501 overwrites the reservation program stored in the reservation memory unit 502a, and reads the overwritten reservation program from the reservation memory unit 502a. The reservation distributing server-side transmitting and receiving unit 501 transmits the reservation program, read from the reservation memory unit 502a, to the client-side transmitting and receiving unit 102 (S6).

In Step S7, the client-side transmitting and receiving unit 102 receives the reservation program from the reservation distributing server-side transmitting and receiving unit 501 and stores the reservation program in the client-side memory unit 103; the program executing unit 104 runs the reservation program stored in the client-side memory unit 103. In Step S8, when the re-request timing is determined to have arrived, Step S2 is executed and the program executing unit 104 causes the client-side transmitting and receiving unit 102 to execute the download request.

In this way, the client-side transmitting and receiving unit 102 makes the download request again at the re-request timing. In this case, when the situation is such that the user cannot run the client 100a by the re-request timing, or the like, the client 100a can be caused to run at the user's desired time, in accord with such a user situation, and the client 100a can be caused to execute the download request. Consequently, even if the user does not input the download request instruction to the client 100a again, the user of the client 100a can estimate the time window, for when the data delivery server 40 can transmit the file, and acquire the file at a time convenient for the user.

Third Embodiment of the Present Invention

Figure 7:
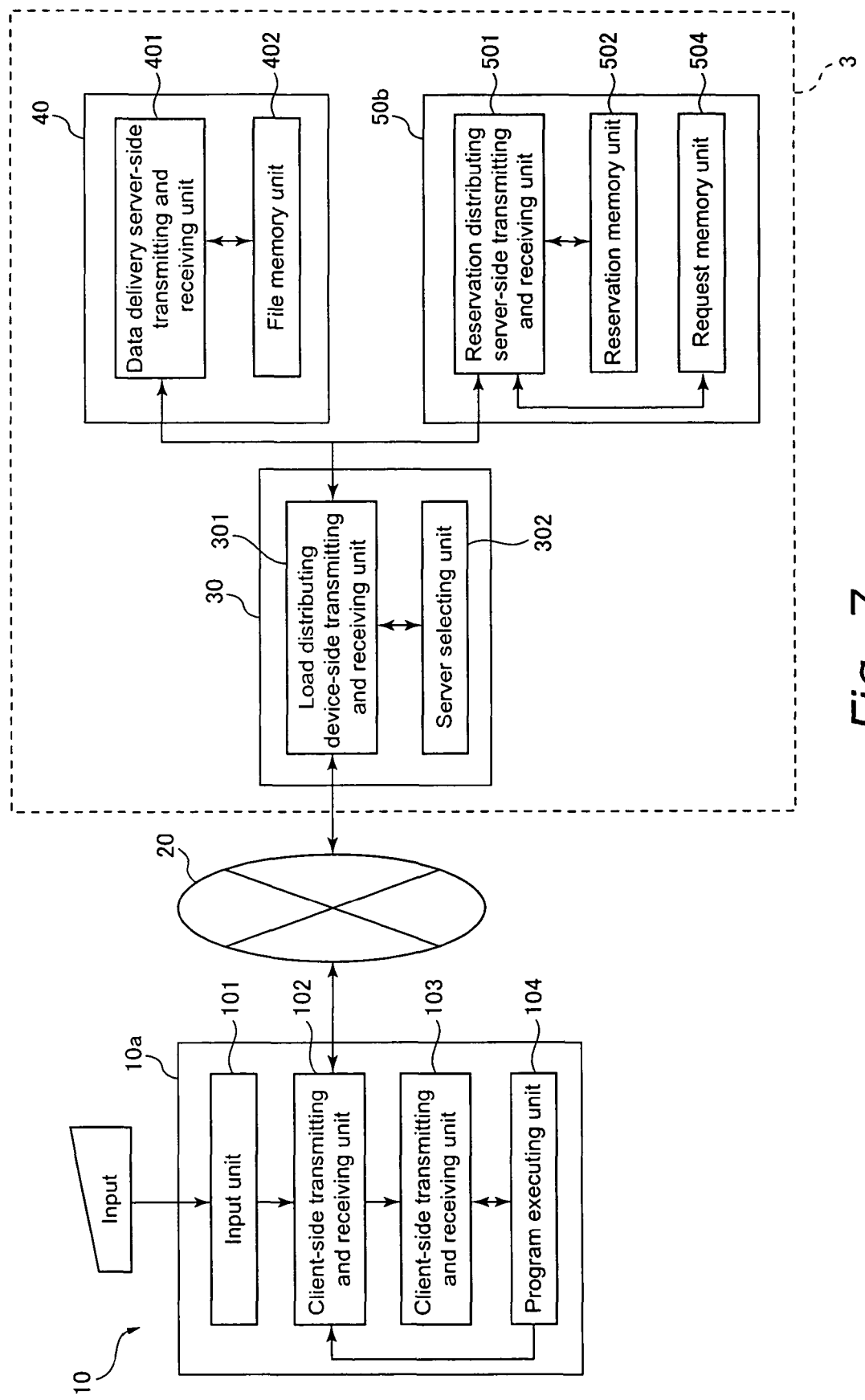
FIG. 7 is a functional block diagram showing the principal functions of a data providing system and a client according to a third embodiment of the present invention.
Figure 8:
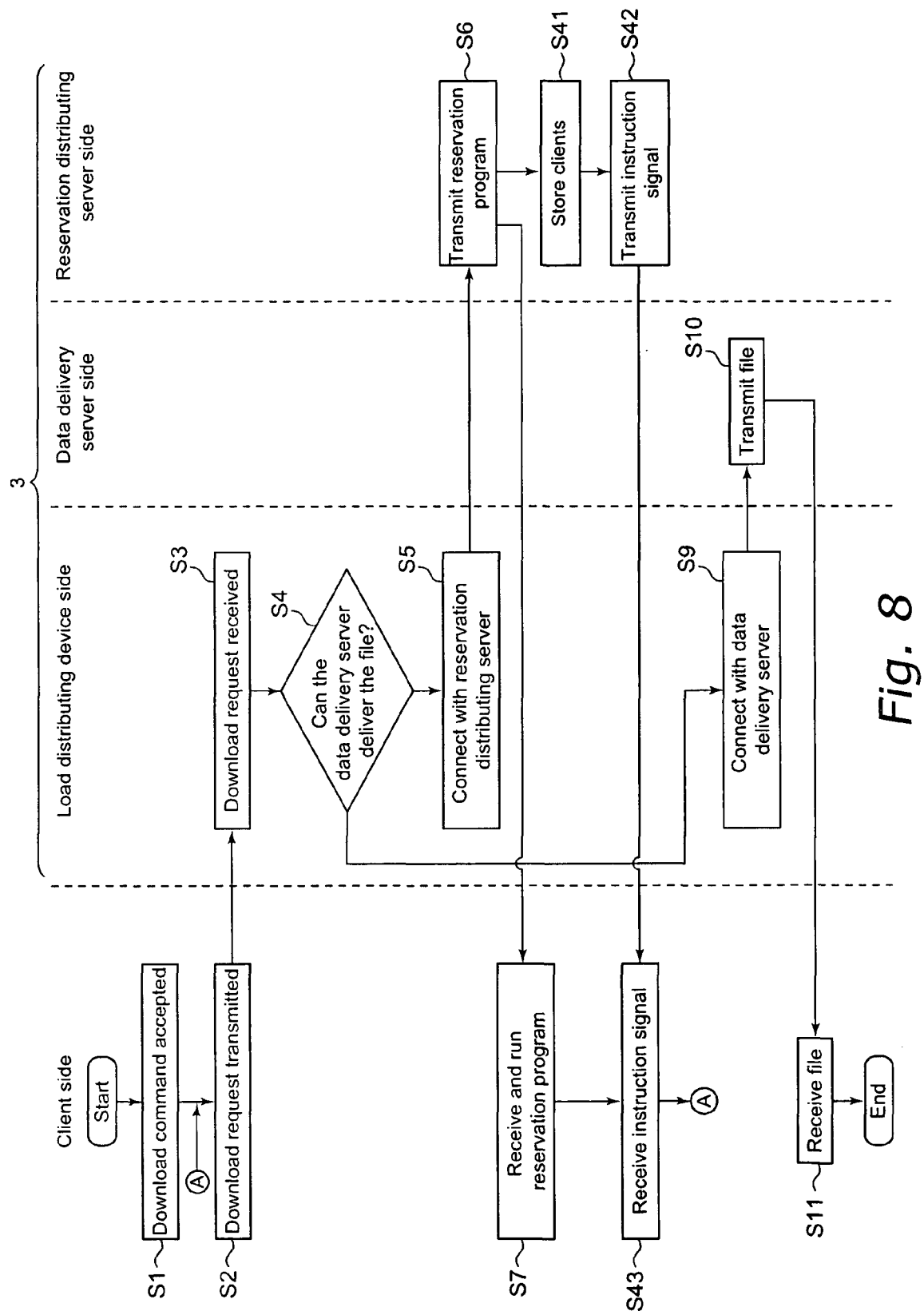
FIG. 8 is a flowchart showing an example of the process sequence for the data providing system shown in FIG. 7 to provide a file to the client.

A data providing system 3, as a network system relating to a third embodiment of the present invention, is described next using FIG. 7 and FIG. 8. With the data providing system 3 relating to the third embodiment of the present invention, in the case where the data delivery server 40 cannot deliver a file without impediment when a client 10a makes a download request, the reservation distributing server 50b distributes a reservation program to the client 10a which made the download request, and transmits an instruction signal, to cause a download request to be issued at the predetermined time, to the client 10a which received the reservation program. Thus, with regards to the reservation distributing server 50b indicating the re-request timing, the present embodiment differs from the data providing system relating to the first and second embodiments of the present invention.

The client 10a which received the reservation program enters standby and is released from standby upon receiving the instruction signal; and the client 10a makes the download request according to the reservation program. Moreover, the instruction signal is delivered to each client in the order in which the reservation distributing server 50b received the download requests, when the data delivery server 40 cannot deliver the file without impediment.

The data providing system 3 relating to the third embodiment of the present invention shares aspects, other than those noted above, with the first embodiment of the present invention, and therefore only those aspects which differ from the data providing system 1 relating to the first embodiment of the present invention are described below. FIG. 7 is a functional block diagram showing the principal functions of a data providing system 3 and a client 10a according to the third embodiment of the present invention.

The example described here is the case where the client 10a makes a download request. Also, the same reference numbers are provided to the functional blocks of the data providing system 3 and client 10a relating to the third embodiment of the present invention, that are the same as the functional blocks of the data providing system 1 and client 10a relating to the first embodiment of the present invention.

The reservation distributing server 50b of this embodiment comprises a request memory unit 504, as request storing means for storing each client making a download request. When the data delivery server 40 is able to deliver a file without impediment, the reservation distributing server-side transmitting and receiving unit 501 transmits an instruction signal, instructing that the download request be made again, to the client 10a which made the download request.

The process sequence for the data providing system 3 shown in FIG. 7 to provide a file to the client 10a is described below using FIG. 7 and FIG. 8. FIG. 8 is a flowchart showing an example of the process sequence for the data providing system 3 shown in FIG. 7 to provide a file to the client 10a. In FIG. 8, the same reference numerals are used for steps which are identical to those in the process sequence for the data providing system 1, relating to the first embodiment of the present invention shown in FIG. 3, to provide a file to the client 10a.

The reservation distributing server 50b, connected with the client 10a in Steps S3 to S5, rejects a download request from the client 10a and transmits a reservation program to the client 10a in Step S6. As described above, the reservation program in this embodiment has the purpose of causing the client 10a to make the download request again when the client 10a receives an instruction signal from the reservation distributing server 50b. The client 10a which received this reservation program in Step S7 enters standby.

After the end of Step S6, the request memory unit 504 stores the client 10a, along with the order of that storage, in Step S41 on the reservation distributing server 50 side. The request memory unit 504 stores each client which made a download request along with the order of the clients. For example, when the client 10a makes a download request after a client 10b and is connected to the reservation distributing server 50b, the client 10a will be stored in the request memory unit 504 after the client 10b.

Thereafter, in Step S42, when the data delivery server 40 is able to deliver a file without impediment, the reservation distributing server 50b sequentially transmits instruction signals, instructing that download requests be made again, to the clients 10 which made download requests, in the order of storage in the request memory unit 504. The reservation distributing server 50b receives from the data delivery server 40 information showing the processing load on the data delivery server 40 at each predetermined time; and thereby, the reservation distributing server 50b determines whether the data delivery server 40 is able to deliver a file without impediment.

In Step S43, the client-side transmitting and receiving unit 102 receives the instruction signal. Thereupon, the program executing unit 104 detects the reception of this instruction signal, releases standby, and executes the reservation program. The process sequence thereby returns to Step S2, and the program executing unit 104 causes the client-side transmitting and receiving unit 102 to make the download request.

In Step S42, the client 10a can make the download request when the download is definitely possible, because the instruction signal is transmitted from the reservation distributing server 50b to the client 10a when the data delivery server 40 becomes able to deliver a file without impediment. As a result, the client 10a can perform file downloads with greater success than with the data providing systems 1 and 2 relating to the first and second embodiments of the present invention. Also, in Step S41, the request memory unit 504 stores the clients 10a and the order of the clients 10a, and transmits the instruction signal to the clients 10 in that order; therefore, it is difficult for bias to arise in the waiting times among the clients which are in standby.

Fourth Embodiment of the Present Invention

Figure 9:
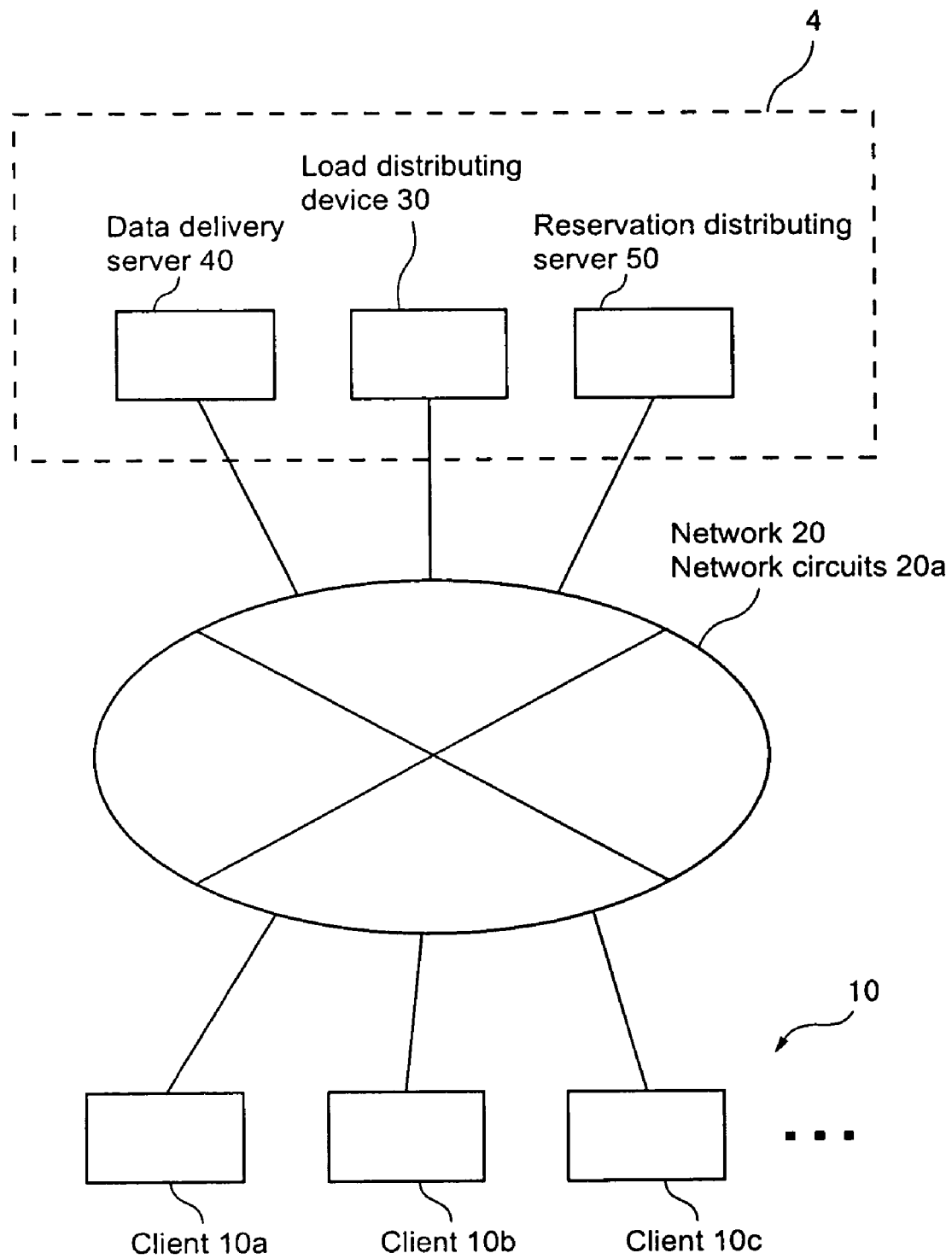
FIG. 9 is a schematic of a data providing system and clients connected to the data providing system relating to a fourth embodiment of the present invention.
Figure 10:
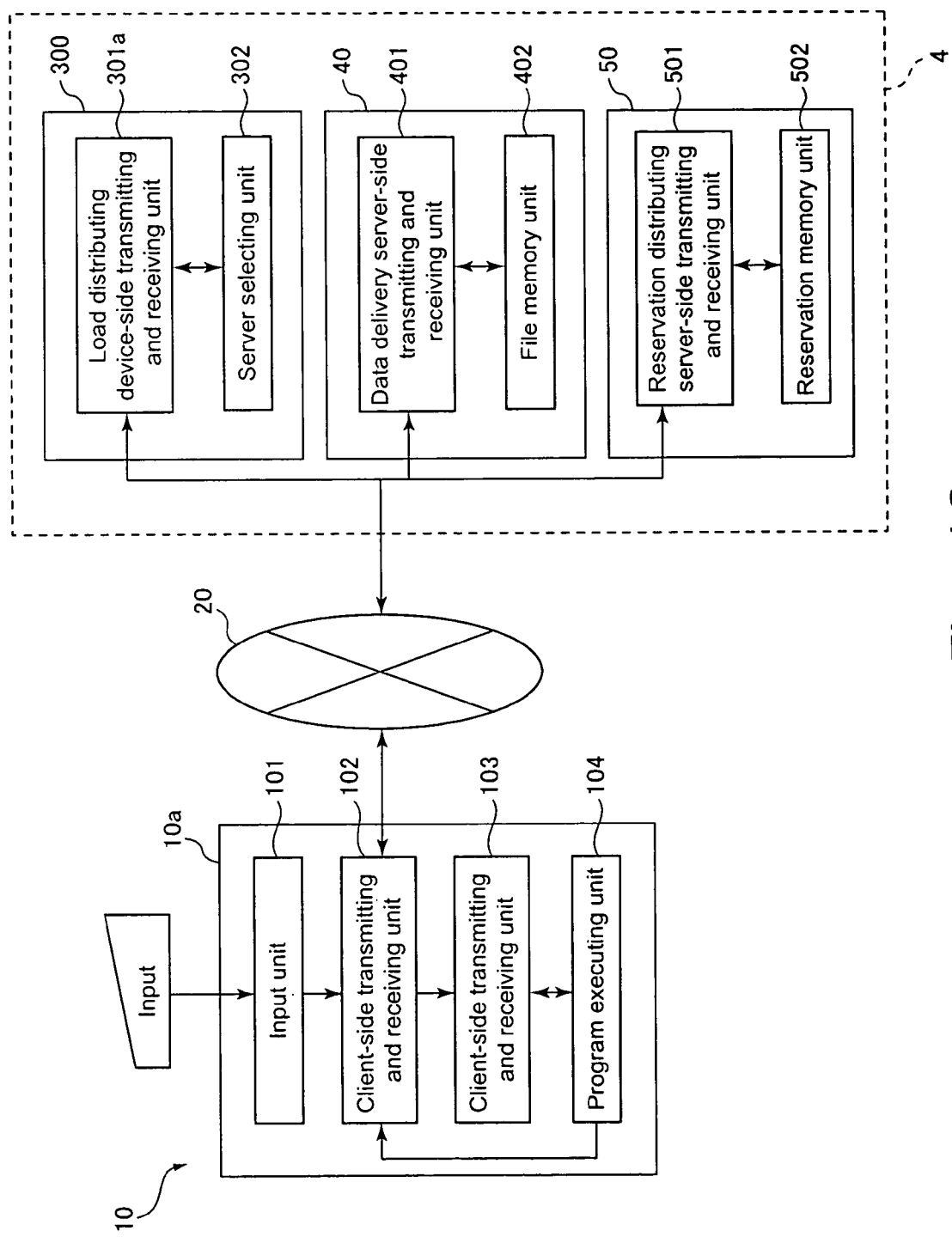
FIG. 10 is a functional block diagram showing the principal functions of the data providing system and a client shown in FIG. 9.

The data providing system 4 relating to the fourth embodiment of the present invention is described using FIG. 9 and FIG. 10. FIG. 9 is a schematic view showing a data providing system 4, as a network system relating to the fourth embodiment of the present invention, and the clients 10 connected to the data providing system 1. FIG. 10 is a functional block diagram showing an example of the principle functions of the data providing system 4 and clients 10 shown in FIG. 9. The example described here is a case where the client 10a shown in FIG. 9 makes a download request.

The data providing system 4 relating to this embodiment differs from the data providing system 1 relating to the first embodiment of the present invention as follows: the client 10a, data delivery server 40, and reservation distributing server 50 are not connected via the load distributing device 300, but are connected individually. Here, the load distributing device 300 is implemented with a router; when the client 10a transmits a download request, first, the load distributing device 300 receives the download request, references its own routing table, and transfers the received download request to either the data delivery server 40 or the reservation distributing server 50.

Here, this routing table is managed by an administrator and is updated depending on the processing situation of the data delivery server 40. When there is an impediment to file delivery by the data delivery server 40, the load distributing device 30 transfers the download request to the reservation distributing server 50 instead of the data delivery server 40. When the data delivery server 40 can deliver a file without impediment, the load distributing device 30 transfers the download request to the data delivery server 40, not the reservation distributing server 50.

As shown in FIG. 10, when the load distributing device-side transmitting and receiving unit 301a receives a download request, the server selecting unit 302a references the routing table and identifies the transfer route shown in the routing table. The load distributing device-side transmitting and receiving unit 301a transfers the download request to either the data delivery server 40 or the reservation distributing server 50, according to the identified transfer route. Then, when the data delivery server-side transmitting and receiving unit 401 receives the transferred download request, the data delivery server-side transmitting and receiving unit 401 transmits to the client 10a a file, such as an application, stored in the file memory unit 402. When the reservation distributing server-side transmitting and receiving unit 501 receives the transferred download request, the reservation distributing server-side transmitting and receiving unit 501 rejects the download request from the client 10a, and transmits a reservation program stored in the reservation memory unit 502 to the client 10a.

In addition to the effects to which the data providing system 1 contributes, the data providing system 4, relating to the fourth embodiment of the present invention, can reduce overall traffic, including the circuit load in the data providing system, because when the reservation program or the file delivered by the data delivery server 40 is transmitted to the client 10a, the transmission does not have to go through the load distributing device 300. Moreover, the data providing system 4 may comprise either a reservation distributing server 50a (see FIG. 5) or a reservation distributing server 50b (see FIG. 7), instead of the reservation distributing server 50.

Fifth Embodiment of the Present Invention

Figure 11:
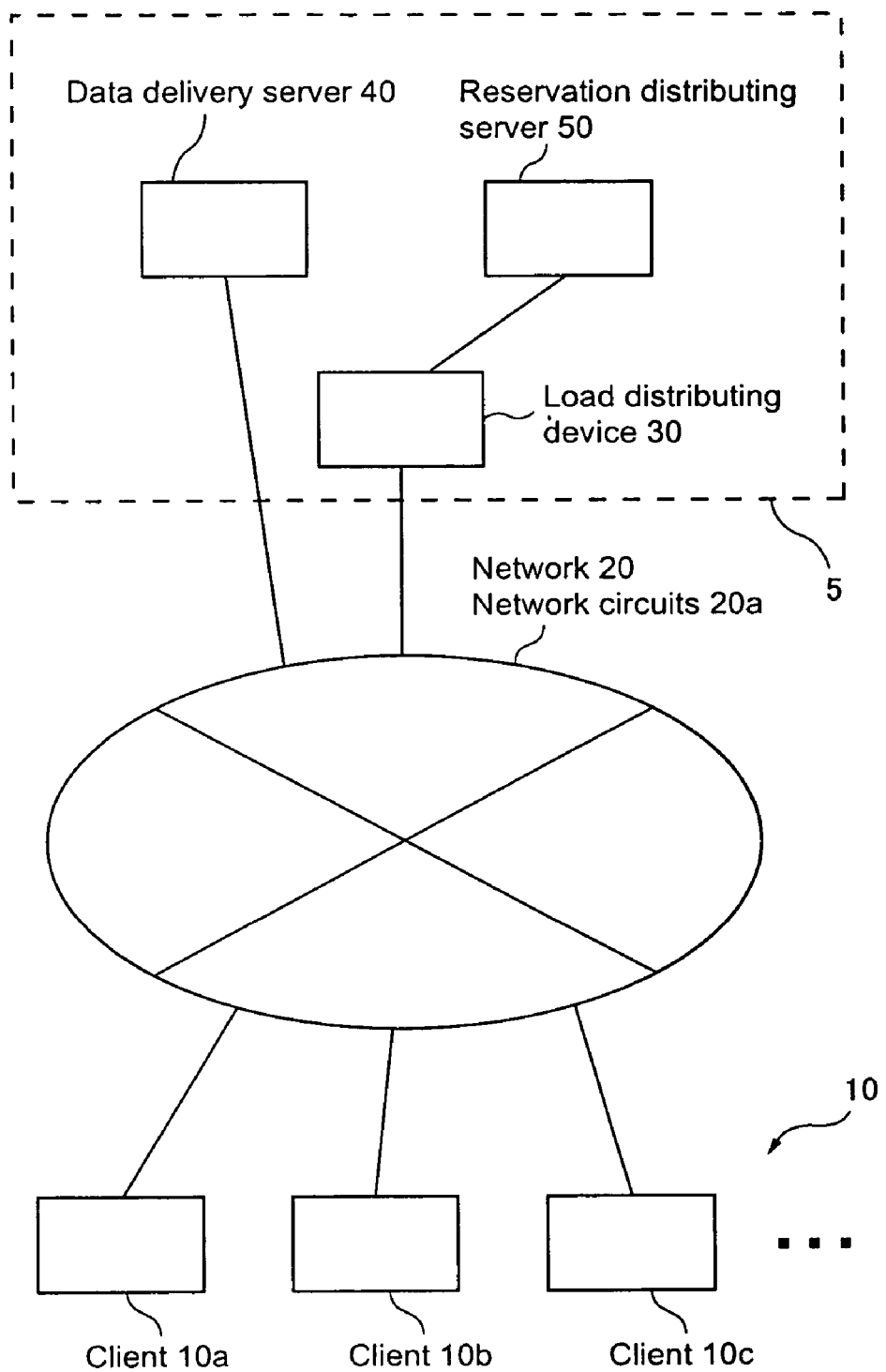
FIG. 11 is a schematic of a data providing system and clients connected to the data providing system relating to a fifth embodiment of the invention.
Figure 12:
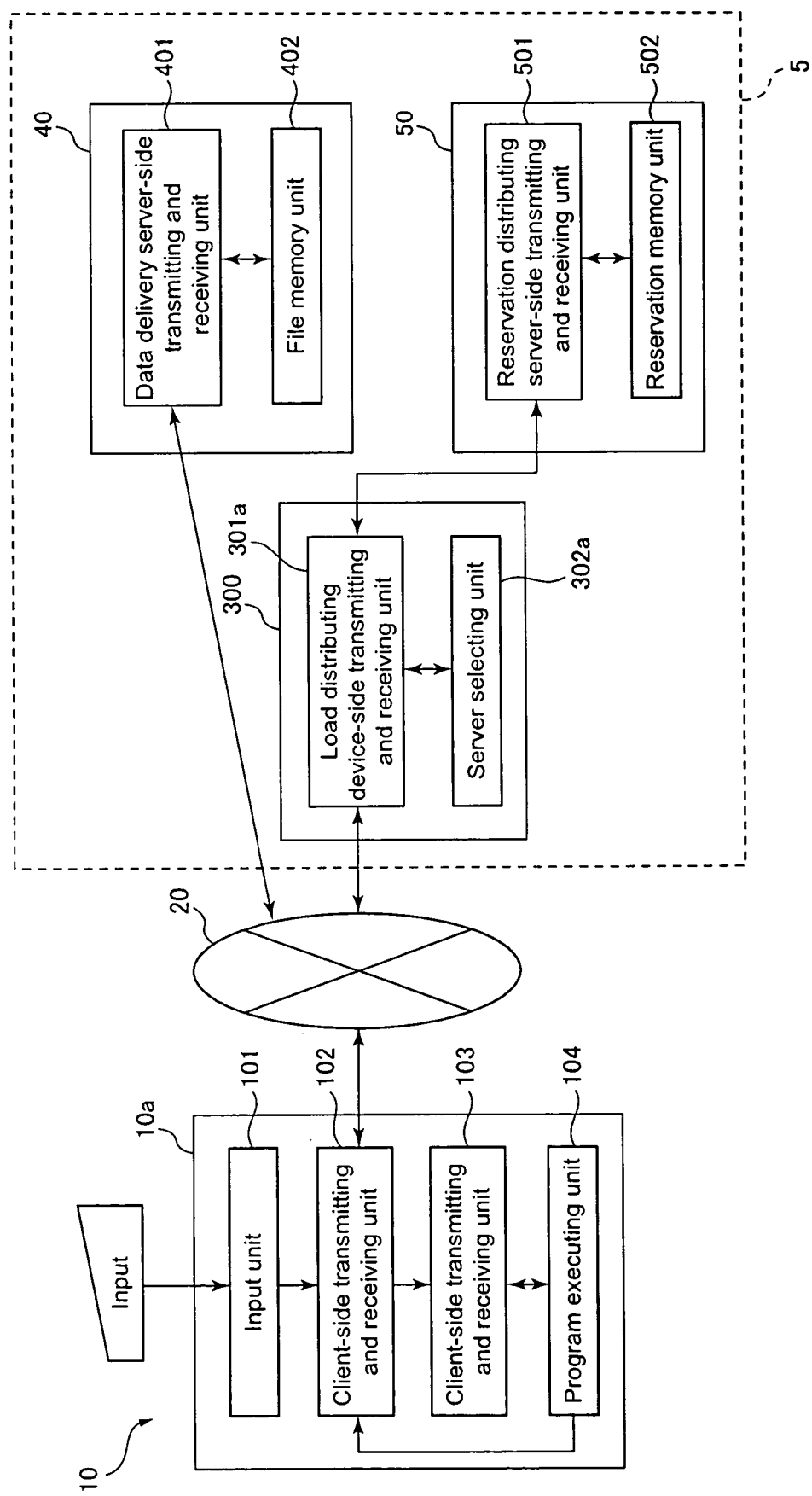
FIG. 12 is a functional block diagram showing the principal functions of the data providing system and a client shown in FIG. 11.

The data providing system 5 relating to the fifth embodiment of the present invention is described using FIG. 11 and FIG. 12. FIG. 11 is a schematic showing a data providing system 5, as the network system relating to the fifth embodiment of the present invention, and clients 10 connected to the data providing system 1. FIG. 12 is a functional block diagram showing an example of the principle functions of the data providing system 5 and clients 10 shown in FIG. 11. The example described here is the case where the client 10a shown in FIG. 11 makes a download request.

The data providing system 5 relating to this embodiment differs from the data providing system 4 relating to the fourth embodiment of the present invention as follows: the client 10a and reservation distributing server 50 are connected with the load distributing device 300 as a relay therebetween, and the data delivery server 40 is connected with the client 10a. Here, the load distributing device 300 is implemented with a router. When the client 10a transmits a download request, first, the load distributing device 300 receives the request. Next, the load distributing device 300 references its own routing table, and transfers the received download request to the data delivery server 40, or relays between the client 10a and the reservation distributing server 50.

In other words, when there is an impediment to the data delivery server 40 delivering a file, the load distributing device 30 relays the download request between the client 10a and the reservation distributing server 50; when the data delivery server 40 can deliver a file without impediment, the load distributing device 30 transfers the download request to the data delivery server 40.

As shown in FIG. 12, when the load distributing device-side transmitting and receiving unit 301a receives a download request, the server selecting unit 302a references the routing table and identifies the transfer route shown in the routing table. The load distributing device-side transmitting and receiving unit 301a either transfers the download request to the data delivery server 40 according to the identified transfer route, or relays the download request between the client 10a and the reservation distributing server 50. Then, when the data delivery server-side transmitting and receiving unit 401 receives the transferred download request, the data delivery server-side transmitting and receiving unit 401 transmits to the client 10a a file, such as an application, stored in the file memory unit 402. When the reservation distributing server-side transmitting and receiving unit 501 receives the transferred download request, the reservation distributing server-side transmitting and receiving unit 501 transmits a reservation program stored in the reservation memory unit 502 to the client 10a.

In addition to the effects to which the data providing system 1 contributes, the data providing system 5, relating to the fifth embodiment of the present invention, can reduce overall traffic, including the circuit load in the data providing system, because when the reservation program is transmitted to the client 10a, the transmission does not go through the load distributing device 300. Moreover, the data providing system 5 may comprise either a reservation distributing server 50a (see FIG. 5) or a reservation distributing server 50b (see FIG. 7), instead of the reservation distributing server 50.

The constitution may also be such that the client 10a and the reservation distributing server 50 are connected, and the data delivery server 40 and client 10a are connected with the load distributing device 300 as a relay therebetween; in that case, traffic in the data providing system can be reduced, because when the file delivered by the data delivery server 40 is transmitted to the client 10a, the file does not go through the load distributing device 300.

Note that variations on the first through fifth embodiments of the present invention include systems wherein the reservation distributing servers 50, 50a, 50b do not comprise a reservation memory unit 502 and do not deliver reservation programs. In this modification, at the re-request timing, or when the data delivery server 40 becomes able to deliver a file without impediment, the reservation distributing servers 50, 50a, 50b may directly access the connected client and indicate the download request, or transmit a message indicating the download request with electronic mail or the like.

Note that, in the first through fifth embodiments of the present invention, the data delivery server 40 comprises any of the reservation distributing server 50, reservation distributing server 50a, and reservation distributing server 50b, and the load distributing device 30 or load distributing device 300, as separate devices, but is not necessarily limited to this. For example, the data providing system may also be a data providing system which does not comprise the reservation distributing server 50, 50a, 50b and the load distributing device 30, 300; wherein the data delivery server 40 comprises a memory unit storing the reservation programs, and when the processing load on the data delivery server 40 is so high that the server cannot provide files, the data delivery server-side transmitting and receiving unit 401 reads the reservation program stored in the memory unit and transmits the program to the client-side transmitting and receiving unit 102.

Moreover, the data providing systems 1 to 5 relating to the first through fifth embodiments of the present invention provide files such as applications in response to requests, but are not limited by this, so long as this is data which can be transmitted or received.

Moreover, the re-request timing in the reservation program is not necessarily a time or time window for which it is predicted that download requests are not concentrated in the data delivery server 40, in the manner of the re-request timing in the reservation program provided to the client 10 or client 100 in the first through fifth embodiments of the present invention.

Note that, in the data providing system 1 to 5 relating to the first through fifth embodiments of the present invention, the data delivery server 40 delivers files to the clients 10, 100 and the reservation distributing server 50, 50a, 50b delivers reservation program to the clients; however, the data delivery server 40 and reservation distributing server 50, 50a, 50b may also be POP (Post Office Protocol) servers.

In this case, when the clients 10, 100 request the reception of data, programs, or the like by electronic mail addressed to the clients 10, 100 themselves, the reservation program is attached to electronic mail and delivered when the POP server cannot respond to the request. Here, the reservation program causes the client to request again the reception of data, programs, or the like, by electronic mail at the re-request timing.

Note that the first through fifth embodiments of the present invention are constituted as data providing systems, because the process executing server to process client requests comprises a data delivery server; however, the process executing server in the present invention is not necessarily required to be a server for delivering data, and embodiments also considered include servers for executing the processing requested by clients on the server itself, or servers for executing processing in concert with clients, or the like.

INDUSTRIAL APPLICABILITY

With the present invention according to the first aspect, depending on the processing situation of the process executing means, such as a high processing load on the process executing means such that processing cannot be executed, or when a high load on the network circuits connected with the process executing means, the request is rejected once with the process requesting means connected with the client, and then the client which requested processing is caused to perform re-request processing to make the request again when the predetermined conditions are satisfied, instead of processing being executed with the process executing means. As a result, even when there is an impediment to the process executing means executing the processing requested by the client, the client can make the processing request again to the process executing means, when the process executing means can execute the processing requested by the client without impediment, due to having, as the predetermined conditions to be satisfied, conditions such as a time when the processing load on the process executing means is less than a predetermined load.

With the present invention according to the second aspect, depending on the processing situation of the process executing means, such as a high processing load on the process executing means such that processing cannot be executed, or a high load on the network circuits connected with the process executing means, the client which requested processing is caused, by the process requesting means connected with the client, to perform re-request processing to make the request again when the predetermined conditions are satisfied, instead of processing being executed with the process executing means. As a result, even when there is an impediment to the process executing means executing the processing requested by the client, the client can make the processing request again to the process executing means, when the process executing means can execute the processing requested by the client without impediment, due to having, as the predetermined conditions to be satisfied, conditions such as a time when the processing load on the process executing means is less than a predetermined load.

With the present invention according to the third aspect, the client automatically performs re-request processing to the network system when the predetermined conditions are satisfied, due to the client receiving and running a re-request program stored in the process request controlling means. Consequently, even when the process executing means cannot execute the processing requested by the client, the client can be caused automatically to make the request again when the predetermined conditions are satisfied, without requiring the user to perform an operation to request that the process executing means process again.

With the present invention according to the fourth aspect, the client will automatically make a download request again after the passage of a predetermined time from the time of the network system captured with a timer or at a predetermined time. Consequently, the user can request that the process executing means process at a given time without the user having to estimate a time for which it is estimated that the processing load on the process executing means will not be high, when the re-request program is stored with the predetermined time being a time for which it is estimated that the processing load on the process executing means will not be high, or the predetermined time is a time until a predetermined time after a time captured with a timer, for example.

With the present invention according to the fifth aspect, the re-request program delivering means stores a re-request program, which causes the request to be made again at a desired predetermined time selected by the user, and delivers the program to the client which selected a desired predetermined time. The client running the re-request program can cause the client to request processing at the user's desired re-request timing.

With the present invention according to the sixth aspect, the client can again request that the process executing means process as instructed and therefore, the user of the client need not himself determine the timing for requesting processing again. Moreover, when the re-request instructing means instructs the client which requested processing to make the request again at a time when the processing load on the process executing means is not high, the processing request can be made to the process executing means at the time without estimating the time at which the processing load on the process executing means is not high.

With the present invention according to the seventh aspect, each client can request that the process executing means process in the order in which processing was requested, because the clients are caused to request that the process executing means process, according to the order of requesting processing.

With the present invention according to the eighth aspect, according to the processing situation of the process executing means, for example in cases such as those wherein the processing load on the process executing means is large enough to impede the execution of processing, the client which requested processing is caused to perform re-request processing, to make the request again, when the predetermined conditions are satisfied, by the process requesting means connected with the client, instead of processing being executed with the process executing means. As a result, even when it is difficult for the process executing means to execute the processing requested by the client, the client can make the processing request to the process executing means again at a time when it is not difficult for the process executing means to execute the processing requested by the client, because the predetermined condition to be satisfied is the condition that the processing load on the process executing means be less than predetermined, for example.

With the present invention according to the ninth aspect, the client requests processing automatically when the predetermined conditions are satisfied, without the client performing the operation to request processing again to the process executing means. As a result, the process executing means can be caused to perform processing without troubling the user to perform the operation for the client to request that the process executing means process.

What is claimed is:

1. A network system connected with a plurality of clients over a network and connected with process executing means for executing downloading requested from each client, comprising:
   process request controlling means; and
   load distributing means for selectively connecting said clients requesting said downloading with said process executing means or said process request controlling means, based on a downloading situation in said process executing means, or a usage situation of the network connected with the process executing means;
   said process request controlling means rejecting requests relating to said downloading from said clients, while indicating to said clients re-request timing on the basis of time statistics being records of download requests by said plurality of clients, for said clients to make said requests again in a period of time, based on predetermined conditions,
   said period of time being predicted to have low usage of said network, on the basis of said time statistic,
   said process request controlling means indicating said re-request timing by delivering to the client a re-request program for causing said client to make said request again,
   a plurality of re-request timings being set so that each of said re-request timings has different time, said re-request timings including said re-request timing,
   said re-request program being delivered in order of said re-request timings.

2. The network system recited in claim 1, wherein
   said process request controlling means indicates said re-request timing to said client, with the passage of a predetermined time from a reference time or a predetermined time as said predetermined conditions.

3. The network system recited in claim 1, wherein
   said process request controlling means accepts a desired re-request timing from a user, and indicates said re-request timing to said client, with said predetermined conditions further being said re-request timing selected by the user.

4. The network system recited in claim 1, wherein
   said process request controlling means indicates said re-request timing by transmitting a signal indicating that said request be made again to said client that requested said downloading.

5. The network system recited in claim 4, wherein
   said process request controlling means has request storing means for storing each of said clients which requested said downloading, and
   the indication of said re-request timing is the transmission of a signal indicating that said request be made again in the order of storage in said request storing means.

6. The network system recited in claim 1, wherein
   if said predetermined conditions are not satisfied, said process request controlling means executes said downloading with less amount of data than requested.

7. The network system recited in claim 1, wherein
   the period of time is selected from a plurality of periods of time that are predicted to have low usage of said network, on the basis of the time statistic.

8. The network system recited in claim 1, wherein
   said load distributing means is implemented with a router having a router table, said routing table on said router is updated in order to modify a transfer route in accordance with processing state on said process executing means, and said load distributing means selectively connects said clients requesting processing with said process executing means or said process request controlling means with said transfer rout on said router table.

9. A network control method for causing process executing means connected with a plurality of clients over a network to execute downloading requested from each client, the network control method comprising the steps of:

selectively connecting said client which requested said downloading to said process executing means or process request controlling means, based on a downloading situation in said process executing means, by the load distributing means; and indicating to said client which requested said downloading, by said process request controlling means, re-request timing being for making said request again on the basis of time statistics being records of download requests by said plurality of clients, for said clients to make said request again in a period of time, based on predetermined conditions, said period of time being predicted to have low usage of said network, on the basis of said time statistic, said indicating said re-request timing including delivering to the client a re-request program for causing said client to make said request again, a plurality of re-request timings being set so that each of said re-request timings has different time, said re-request timings including said re-request timing, said re-request program is delivered in order of said re-request timing.

\* \* \* \* \*